US 7,774,365 B2

(12) United States Patent
Oxenstierna et al.

(10) Patent No.: US 7,774,365 B2
(45) Date of Patent: Aug. 10, 2010

(54) ORGANIZATIONAL REFERENCE DATA AND ENTITLEMENT SYSTEM

(75) Inventors: David Oxenstierna, Boston, MA (US);
Prashant Reddy, New York, NY (US);
David Rutter, Brooklyn, NY (US);
Umesh Subramanian, Jackson Heights, NY (US); Jonathan M. Taylor, New York, NY (US)

(73) Assignee: Morgan Stanley, New York, NY (US)

( * ) Notice: Subject to any disclaimer, the term of this patent is extended or adjusted under 35 U.S.C. 154(b) by 742 days.

(21) Appl. No.: 10/930,642

(22) Filed: Aug. 31, 2004

(65) Prior Publication Data
US 2007/0250508 A1   Oct. 25, 2007

(51) Int. Cl.
*G06F 17/30* (2006.01)
(52) U.S. Cl. ..................................... 707/783; 709/204
(58) Field of Classification Search .................. None
See application file for complete search history.

(56) References Cited

U.S. PATENT DOCUMENTS

| | | | | |
|---|---|---|---|---|
| 5,634,053 A * | 5/1997 | Noble et al. | ................... | 707/4 |
| 5,765,153 A | 6/1998 | Benantar et al. | | |
| 5,966,715 A | 10/1999 | Sweeney et al. | | |
| 6,023,765 A | 2/2000 | Kuhn | | |
| 6,070,244 A | 5/2000 | Orchier et al. | | |
| 6,088,679 A | 7/2000 | Barkley | | |
| 6,158,007 A | 12/2000 | Moreh et al. | | |
| 6,385,652 B1 | 5/2002 | Brown et al. | | |
| 6,603,476 B1 * | 8/2003 | Paolini et al. | ................ | 345/427 |
| 6,742,180 B1 * | 5/2004 | Ritz | ........................... | 717/174 |
| 6,880,158 B1 * | 4/2005 | Basso et al. | .................. | 719/321 |
| 7,000,222 B1 * | 2/2006 | Curtis et al. | ................. | 717/118 |
| 7,149,698 B2 * | 12/2006 | Guheen et al. | ................. | 705/1 |
| 7,165,174 B1 * | 1/2007 | Ginter et al. | ................. | 713/153 |
| 2002/0169876 A1 * | 11/2002 | Curie et al. | ................. | 709/226 |
| 2002/0188674 A1 | 12/2002 | Brown et al. | | |
| 2003/0212664 A1 * | 11/2003 | Breining et al. | ................. | 707/3 |
| 2004/0122790 A1 * | 6/2004 | Walker et al. | ................... | 707/1 |
| 2005/0216555 A1 * | 9/2005 | English et al. | .............. | 709/204 |

OTHER PUBLICATIONS

"Bridgestream—Company—The Problem," printed from www.bridgestream.com/the_problem.php accessed on Dec. 14, 2004, 2 pages.
"Bridgestream—Solutions," printed from www.bridgestream.com/solutions.php accessed on Dec. 14, 2004, 2 pages.
"Bridgestream—Products," printed from www.bridgestream.com/products.php accessed on Dec. 14, 2004, 2 pages.
D. Heimbigner et al., A Federated Architecture for Information Management, ACM Transactions on Information Systems, v.3 n.3, p. 253-278, Jul. 1985.
ILOG JRules: Leading the Way in Business Rule Management Systems, ILOG, Mar. 2005 (15 pages).

* cited by examiner

*Primary Examiner*—Don Wong
*Assistant Examiner*—Shyue Jiunn Hwa
(74) *Attorney, Agent, or Firm*—K&L Gates LLP

(57) ABSTRACT

A system including a centralized organizational information system in communication with a centralized organizational information database. The system also includes a federated set of entitlements engines in communication with the centralized organizational information system and a plurality of entitlement databases, wherein each of the entitlements engines is for determining whether a user is entitled to access secured resources requested by the user.

25 Claims, 21 Drawing Sheets

1. Create Team XYZ
    1a.  Add Team
    1b.  Create Team's Relationship to Organization
2. Add Membership: Debra as Member
3. Assign Role: Trades Processing
4. Assign Coverage: CAG Clients A-C

ORGANIZATIONAL REFERENCE DATA AND ENTITLEMENT SYSTEM

BACKGROUND

Many organizations, such as those in the financial services industry, have multiple databases and systems that are operative to store and manage data regarding, for example, human resources information, client information, etc. Such systems are generally not federated systems and do not allow for sharing of data by multiple applications, centralized resource entitlement, or ease of workflow routing. Also, in such systems each application must determine which users are entitled to access various resources or perform various functions. Thus, each application must have its associated entitlement logic, maintain up-to-date entitlements data, and store the data in storage that is local to the application.

Such systems may be particularly unwieldy in, for example, a financial services entity because access to client accounts is oftentimes restricted and overbroad access may be inadvertently granted to a user that has access to a certain class of resources. Also, because users often move to other organizations within the entity, and their access credentials may not be updated, a user may retain their outdated credentials while assuming new credentials. Such a user would then have the ability to perform functions according to the outdated credentials and the new credentials.

SUMMARY

In one embodiment, the present invention is directed to a system including a centralized organizational information system in communication with a centralized organizational information database. The system also includes a federated set of entitlements engines in communication with the centralized organizational information system and a plurality of entitlement databases, wherein each of the entitlements engines is for determining whether a user is entitled to access secured resources requested by the user.

In one embodiment, the present invention is directed to a system. The system includes a centralized organizational information system in communication with a centralized organizational information database, wherein the organizational information database includes organizational data. The system also includes a plurality of federated entitlements engines in communication with the organizational information system, wherein each of the entitlements engines uses the organizational data to determine whether a user is entitled to access a secured resource. The system further includes a workflow application in communication with the organizational information system, wherein the workflow application uses the organizational data for routing items of work and a reporting application in communication with at least one of the entitlements engines and the organizational information system; wherein the reporting application uses the organizational data for reporting information to a user of the reporting application.

In one embodiment, the present invention is directed to a computer-implemented method. The method includes storing, in a centralized database, organizational data relating to an organization and determining, based on data stored in an entitlements database that is in communication with at least one of a plurality of federated entitlements engines, whether a user is entitled to access secured resources.

In one embodiment, the present invention is directed to a computer-readable medium having stored thereon instructions which, when executed by a processor, cause the processor to store, in a centralized database, organizational data relating to an organization, and determine, based on data stored in an entitlements database that is in communication with at least one of a plurality of federated entitlements engines, whether a user is entitled to access secured resources.

In one embodiment, the present invention is directed to an apparatus. The apparatus includes means for storing, in a centralized database, organizational data relating to an organization, and means for determining, based on data stored in an entitlements database that is in communication with at least one of a plurality of federated entitlements engines, whether a user is entitled to access secured resources.

BRIEF DESCRIPTION OF THE DRAWINGS

Further advantages of the present invention may be better understood by referring to the following description taken in conjunction with the accompanying drawings, in which.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. Also, although various embodiments of the present invention are described herein as being employed in a financial services entity, it can be understood that the various embodiments of the present invention may be employed in any type of entity in any type of industry.

As used herein, the term "entitlement" means management of access control policies for a individual, a computer user, etc. to access a protected resource such as a data resource or other type of data, an application, a work flow task, functionality within an application, etc.

In various embodiments of the present invention, an entitlements integrator, using defined business entitlement rules, translates organizational data and other data into entitlements. The entitlements are stored as entitlement data and applications enforce entitlements by making decisions based on entitlements information queried from an entitlements engine.

Figure 1:
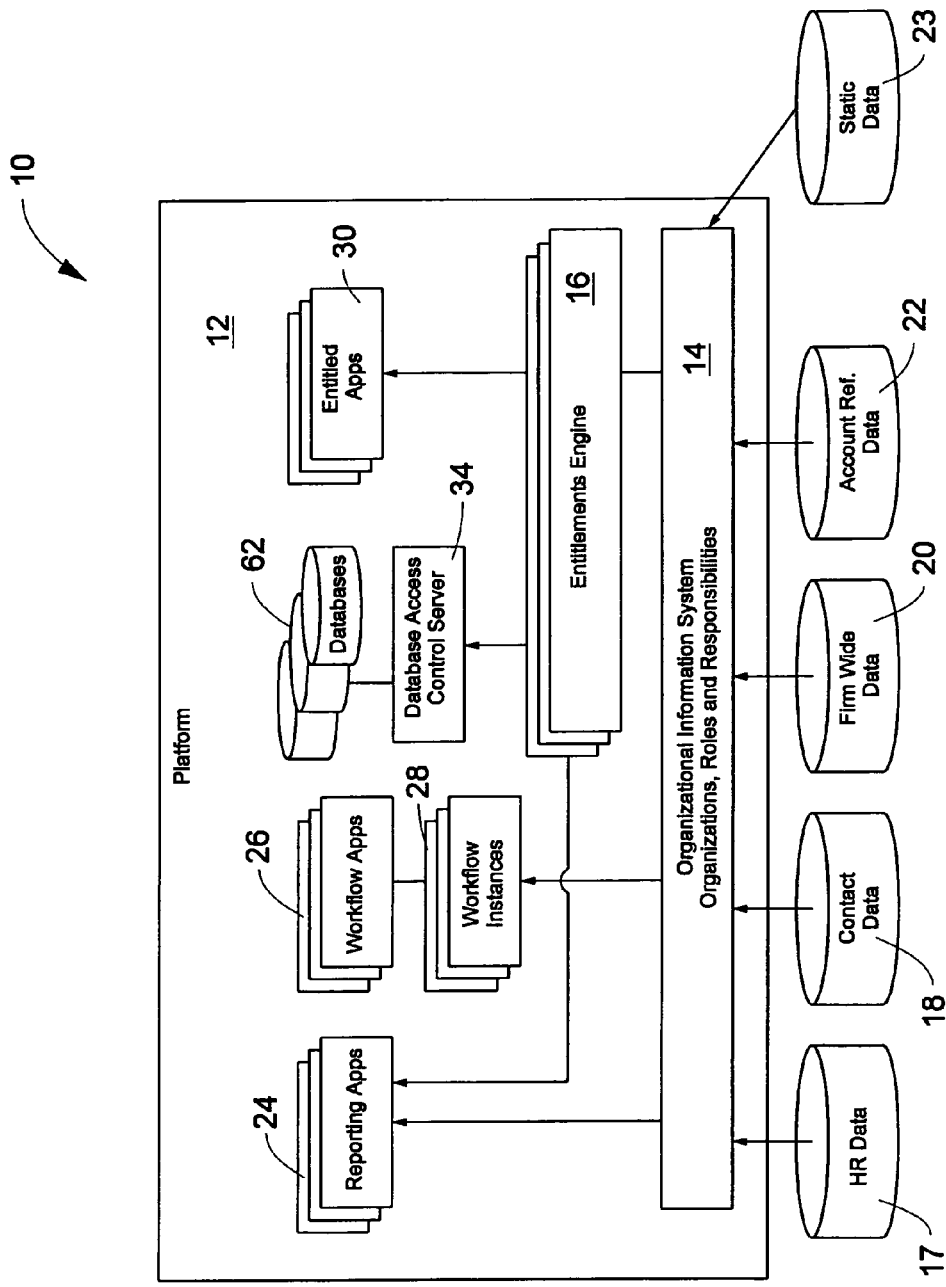
FIG. 1 is a diagram illustrating a system having an organizational data and entitlement platform according to one embodiment of the present invention.

FIG. 1 is a diagram illustrating a system 10 having a reference data and entitlement platform 12 according to one embodiment of the present invention. The platform 12 includes an organizational information system 14 and an entitlements engine 16. The organizational information system 14 manages organizational information relating to organizations, roles, responsibilities, etc. of various members of an entity or organization in which the system 10 is deployed. The entitlements engine 16 manages entitlement as it relates to the various resources (e.g. data, applications, etc.) that are associated with or integrated with the system 10.

In order to accurately describe an organization, the organizational information system 14 may refer to data that is resident in various databases including, for example, a human resources database 17 (e.g., containing human resources data), a contact data database 18 (e.g., containing client contact data), a firmwide directory database 20 (e.g., containing data relating to those members in the organization, or firm, in which the system is utilized), an account reference data database 22 (e.g., containing information relating to accounts, account owners, etc.), and a static data database 23 (e.g., containing, for example, lists of countries and currencies etc.). An example of the organization and type of data that may be stored in the account reference data database 22 is contained in U.S. Patent Application Publication No. US 2002/0116304, which is owned by the assignee of the present application and which is incorporated herein by reference.

The organizational information system 14 may be accessed by various reporting applications 24. The reporting applications 24 enable a user to generate various reports relating to the organization such as, for example, sales revenue reports. Workflow applications 26 may utilize organizational information, as requested by workflow instances 28, from the organizational information system 14. The workflow applications 26 may be, for example, transaction event and exception routing applications, or other workflow applications such as Savvion-based applications. Entitled applications 30 utilize secured resources, access to which is determined by the entitlements engine 16. The entitlements engine 16 determines if a user of an entitled application 30 is entitled to access secured resources on the basis of entitlement data that is derived from the organizational information system 14. Databases 62 are examples of secured resources. Application access to databases 62 can be restricted by a database access control server 34. The database access control server 34 obtains entitlements from the entitlements engine 16. The database access control server 34 may be, for example, a server such as a Sybase Openserver.

Figure 2:
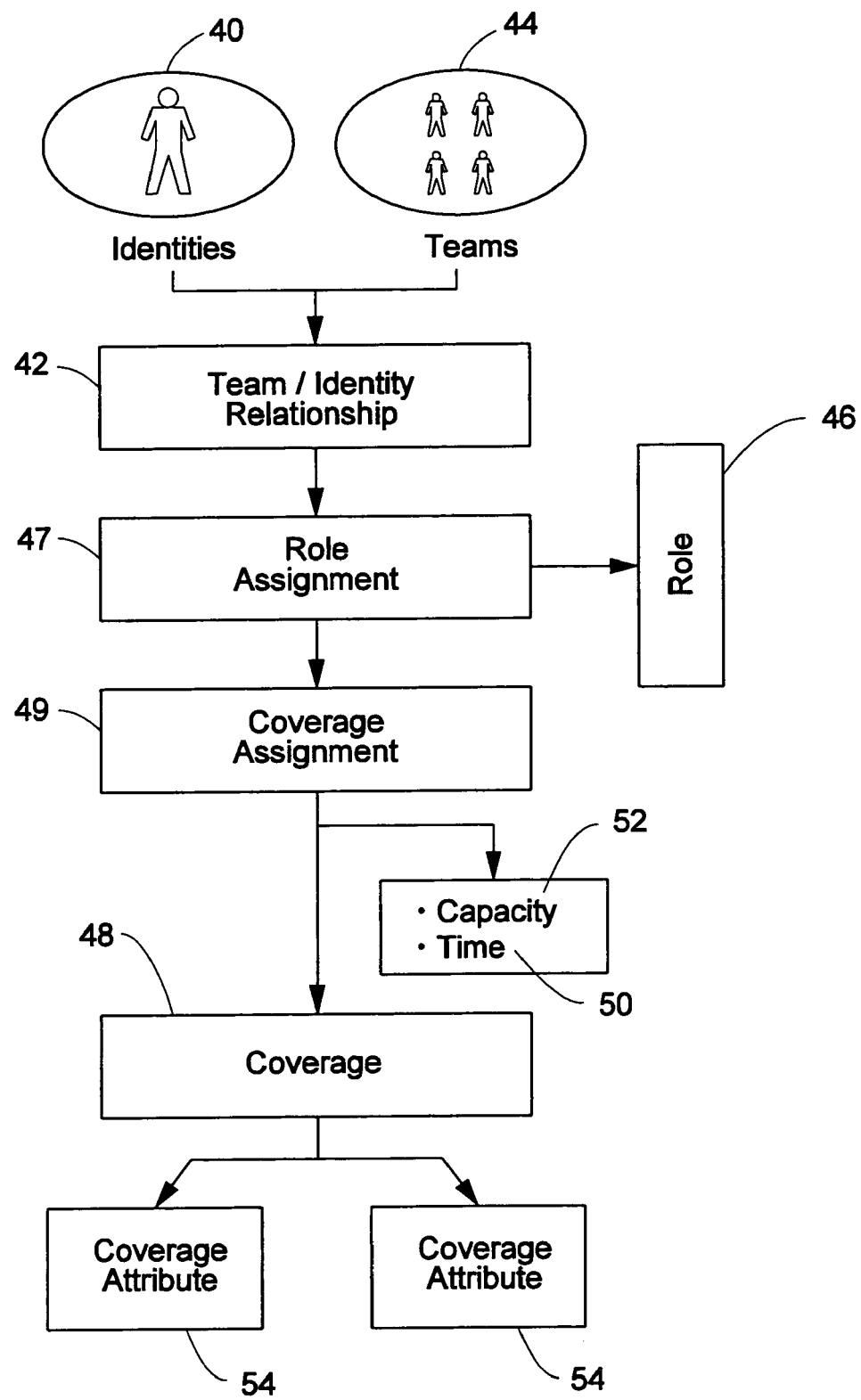
FIG. 2 is a diagram illustrating high level data concepts in a data architecture for the organizational data according to one embodiment of the present invention.

FIG. 2 is a diagram illustrating high-level data concepts in a data architecture for the organizational information system 14 according to one embodiment of the present invention. Identities 40 list all users of the system 10 and teams 44 list all teams that are associated with the system 10. Examples of identities 40 may be employees, contingent workforce personnel, contacts, and automated agents. A relationship 42 defines a relationship between either an identity 40 and a team 44, or between teams 44. The teams 44 may be, for example, organizational teams or virtual teams (i.e. loosely organized teams or teams without formal organization delineators). Examples of relationships 42 are:

1. Joe Employee is a senior manager of department X.
2. Joe Consultant is a consultant to virtual team Y.
3. The relationship between department X and team Y is enabled by task order Z.

Roles 46, as assigned by role assignments 47, define job functions that are assigned to a team 44 or an identity 40 on a team 44 (e.g., client service, data quality, sales trader, research sales, etc.). Coverage 48, as assigned by coverage assignment 49, defines the scope of a team's, or an identity's responsibilities with respect to the assigned role 46 (e.g., covers clients A-M in the equity division). Time 50 defines the periodicity of the coverage (e.g., Monday through Friday from 9 am to 5 pm EST). Coverage capacity 52 defines the nature of the responsibility of a team 44 or identity 40 (e.g., primary or backup, responsible or interested, etc.). Coverage 48 is defined by coverage attributes 54. Each coverage attribute describes a line of business, financial product, client, system, etc. for which service is being provided by the identities 40 and/or the teams 44.

Figure 3:
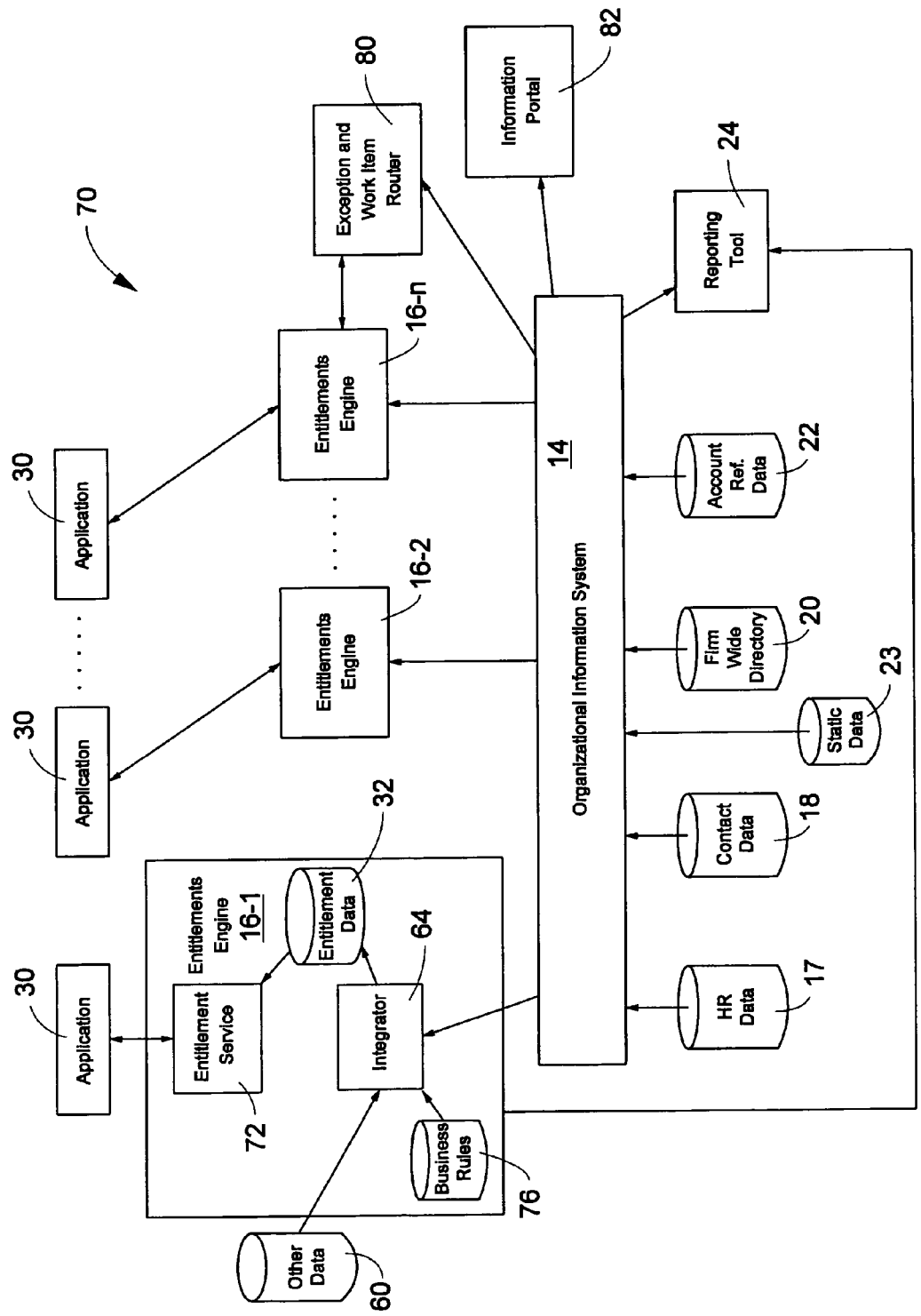
FIG. 3 is a diagram illustrating an entitlement system according to one embodiment of the present invention.

FIG. 3 is a diagram illustrating an entitlement system 70 according to one embodiment of the present invention. As can be seen in FIG. 3, entitlement is done on a federated basis for a number of applications 30. Each of the applications 30 is shown in FIG. 3 as a separate domain that interfaces with a different entitlements engine 16-1 through 16-n. However, it can be understood that a domain that is serviced by an entitlements engine 16 may include more than one application 30. Each entitlement service 72 may have multiple domains and each entitlement service 72 has its own local (entitlement) database 32. In one embodiment, the data that is stored in each of the databases 32 is consistent for each of the entitlements engines 16.

The entitlements data stored in the databases 32 is derived from the organizational information system 14 and other data 60. Business rules 76 define functions and data that need to be protected and who should have access to such functions and data. An example of a business rule 76 is: Everyone with a role of "sales trader" in the ABC group can view trades for the clients that they cover. The other data 60 may be, for example, data that is specific to a particular domain. Integrators 64 read data from the organizational information system 14 and apply business rules 76 to the data. The integrators 64 also store entitlement data in the entitlement databases 32. As such, the entitled applications 30 can make entitlement queries of the entitlements engine 16.

As shown in FIG. 3, when a user using an entitled application 30 attempts to use the application 30 in a way that requires the application 30 to access protected resources, the appropriate entitlements engine 16 determines whether that particular user is authorized to access the protected resources.

In one embodiment, the organizational information system 14 includes a set of maintenance rules (not shown). The maintenance rules may be logical tests that regulate the creation, modification, deletion, etc. of a particular set of organizational information. For example, such a logical test could ensure that a group is not a subgroup of itself. The maintenance rules also may be constraints on what roles 46 or coverage 48 an individual can have. Examples of such rules may be:

1. Anyone with a role of "sales trader" cannot also have a role of "payment processing."
2. Anyone with a role of "sales trader" must have a current NASD Series 7 license.

The system 70 includes an exception and work item router 80 that processes exceptions and routes work flow items. The ability to route work items (exceptions from trade processing systems, incoming faxes, workflow items, etc.) automatically to the rightful owners yields significant benefits. These benefits include, for example, efficiencies because no manual effort is required to forward the work item to the correct owner, risk management improvements because the possibility of misrouting items is greatly reduced, improved customer service because work items are available to client service representatives in a more timely fashion, etc. Various embodiments of the present invention use organizational data including coverage and role definitions to interface with work item systems such as exception processing systems and workflow automation systems.

The system 70 also includes an information portal 82. Organizations often make extensive use of web-based information portals to deliver content to internal users and external clients. The content of such portals varies depending on the needs of the individual users and business areas, based on criteria such as product area, market, location, business division, etc. Significant manual effort is often expended on profiling information portal content to tailor it to specific departments and classes of users. Various embodiments of the present invention use organizational data including coverage and role definitions to determine actual content required in the information portal 82, thus reducing the need for manual content customization.

In operation, the types of requests made by the applications 30 to the organizational information system 14 may be, for example, non-entitlement requests such as requests concerning teams, roles, and coverage. Examples of such requests may be:

1. What team(s) is Sarah Jones on?
2. Who has the role of "sales trader?"
3. Who in the XYZ Division New York team is responsible for confirms processing for the ABC Client Corporation cash equity business?

The types of requests made by the applications 30 to an entitlements engine 16 may be, for example, entitlement requests such as requests concerning operations or reporting. Examples of such requests may be:

1. Can Joe Smith authorize a $1MM payment?
2. Who has the ability to view trades relating to ABC Client Corporation?

Figure 4:
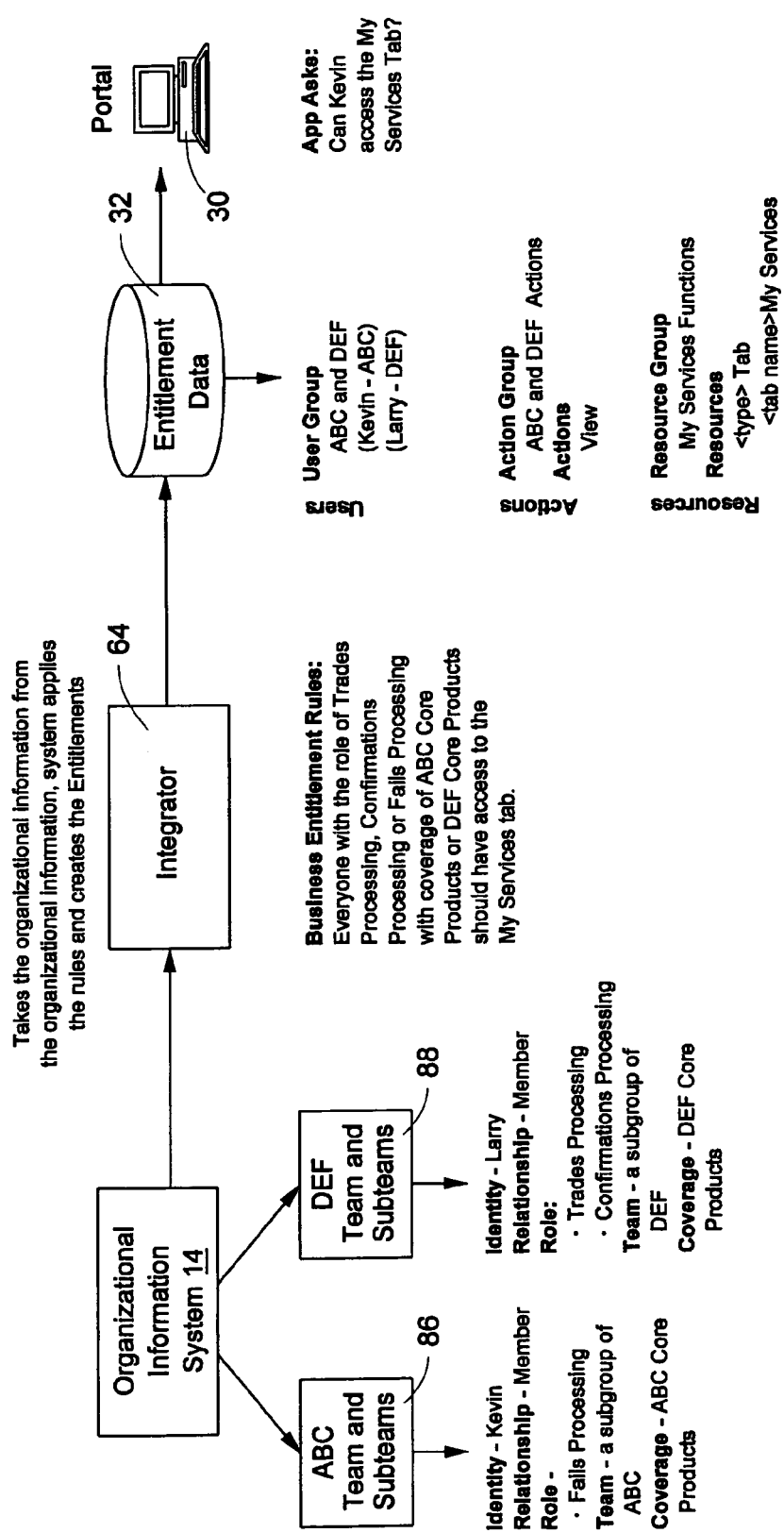
FIG. 4 is a diagram illustrating an example of entitling a secured function using the system of FIG. 1 according to one embodiment of the present invention.

FIG. 4 is a diagram illustrating an example of controlled access to a secured function using the system 10 of FIG. 1 according to one embodiment of the present invention. In the example, the organizational information system 14 contains information on an ABC team and subteams 86 and a DEF team and subteams 88. An individual "Kevin" is on a subgroup of the ABC team and an individual "Larry" is on a subgroup of the DEF team. The integrator 64 takes this information from the organizational information system 14, applies the business rules 76, and creates entitlement data 32. An example of a relevant business rule 76 is that "everyone with the role of trades processing, confirmations processing or fails processing with coverage of ABC Core Products or DEF Core Products should have access to the My Services Tab." The entitlement data 32 is that Kevin is on the ABC team and Larry is on the DEF team and the ABC and DEF action of "View" relates to the resource group "My Services Functions." Thus, an application in a portal that asks: "Can Kevin access the My Services Tab?" will receive an affirmative reply from the entitlements engine 16.

Figure 5:
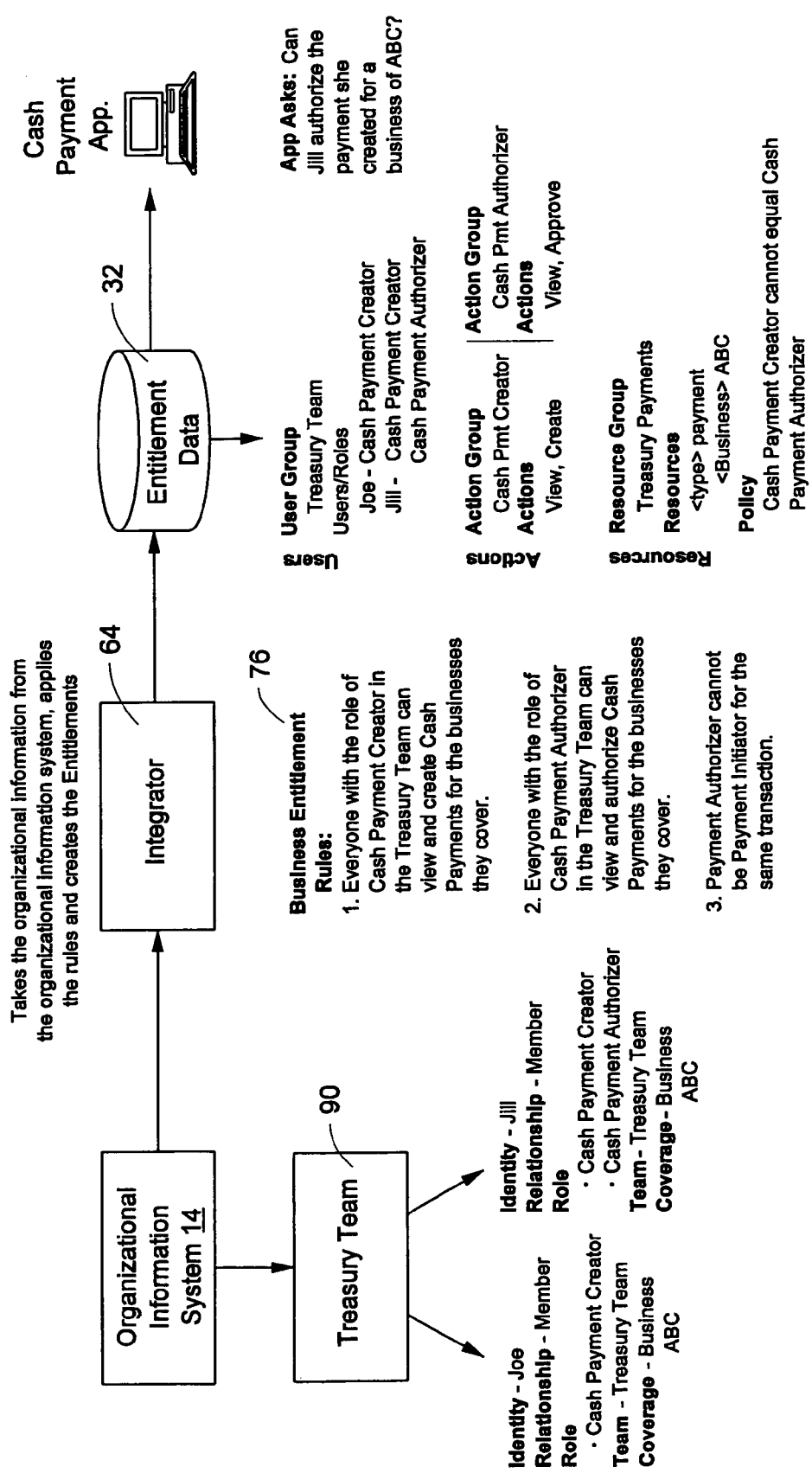
FIG. 5 is a diagram illustrating an example of entitling a secured function using the system of FIG. 1 according to one embodiment of the present invention.

FIG. 5 is a diagram illustrating another example of controlled access to a secured function using the system 10 of FIG. 1 according to one embodiment of the present invention. In the example, the organizational information system 14 includes data on a treasury team 90. The treasury team 90 includes information that Joe has the role of cash payment creator for Business ABC and that Jill has the roles of cash payment creator and cash payment authorizer for Business ABC. The integrator 64 takes this information from the organizational information system 14, applies the business rules 76, and creates entitlement data 32. Examples of relevant business rules 76 are that "everyone with the role of cash payment creator in the treasury team can view and create cash payments for the businesses that they cover," "everyone with the role of cash payment authorizer in the treasury team can view and authorize cash payments for the businesses that they cover," and "payment authorizer cannot be payment initiator for the same transaction." The entitlement data 32 is thus that Joe has the role of creator and Jill has the roles of creator and authorizer in the treasury team, that Joe can view and create and Jill can view, create, and approve, that Joe and Jill have access to the resources of treasury payments, and that, as a policy, a cash payment creator cannot equal a cash payment authorizer.

In the example shown in FIG. 5, when a cash payment application asks: "Can Jill authorize this payment that she created for a Business of ABC?," the entitlement engine 16 will answer in the negative because, as per the policy, the creator cannot be the same individual as the authorizer.

Figure 6:
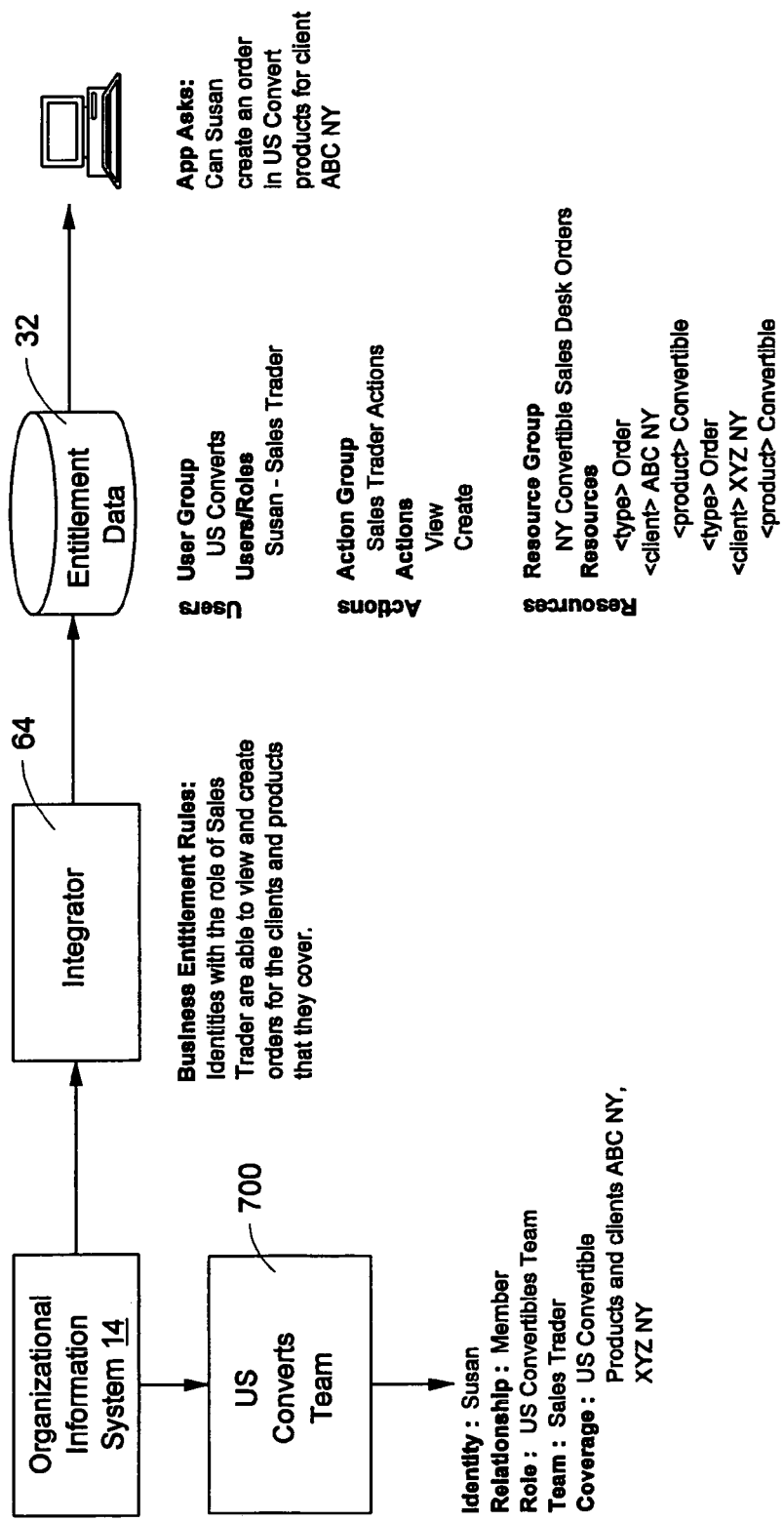
FIG. 6 is a diagram illustrating an example of entitling a secured function using the system of FIG. 1 according to one embodiment of the present invention.

FIG. 6 is a diagram illustrating another example of controlled access to a secured function using the system 10 of FIG. 1 according to one embodiment of the present invention. In the example, the organizational information system 14 includes a US convertibles team 700. The convertibles team 700 includes information that Susan has the role of sales trader for US convertible products and for clients ABC NY and XYZ NY. The integrator 64 takes this information from the organizational information system 14, applies the business rules 76, and creates entitlement data 32. An example of a relevant business rule 76 is that "identities with the role of sales trader are able to view and create orders for the clients and products that they cover." The entitlement data 32 is thus that Susan has the role of sales trader and she can view and create the resources of NY convertible sales desk orders.

In the example shown in FIG. 6, when an order entry application asks: "Can Susan create an order in US convertible products for client ABC NY?," the entitlement engine 16 will answer in the affirmative.

Figure 7:
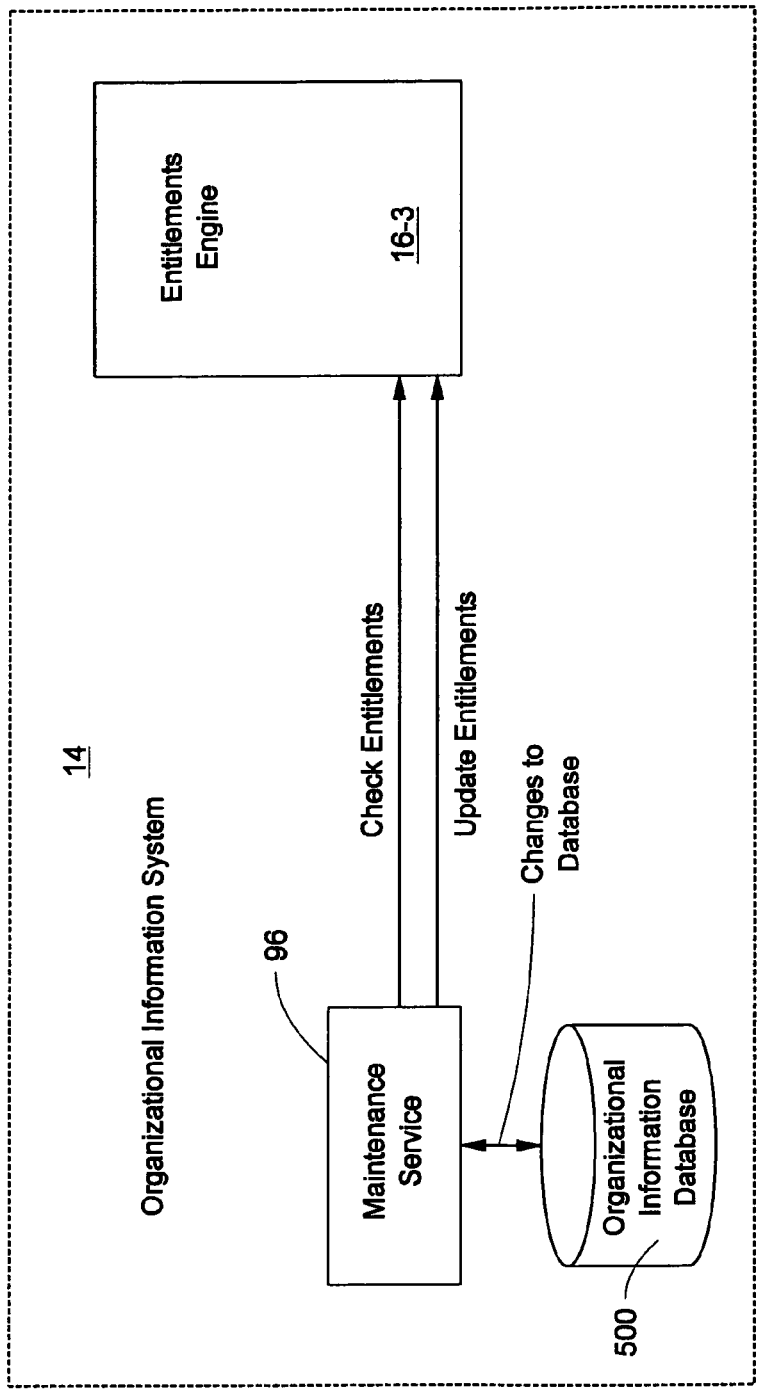
FIG. 7 is a diagram illustrating use of the entitlements engine by the organizational information system itself according to one embodiment of the present invention.

FIG. 7 is a diagram illustrating use of the entitlements engine 16 by the organizational information system 14 itself according to one embodiment of the present invention. An organizational information system 14 includes an organizational information database 500, a maintenance service 96, and an entitlements engine 16-3. The maintenance service 96 validates all requests made of the organizational information system 14 (e.g., create, update, read, delete, etc.) using the entitlements engine 16-3.

A maintenance service 96 permits, for example, authorized users to maintain the organizational information. In one embodiment, the maintenance service 96 uses an entitlement engine 16-3 to verify that the user of the maintenance service is entitled to access organizational information. In operation, the maintenance service 96 allows a user of the organizational information system 14 to add, remove, update, and alter organization information as described in connection with FIG. 2.

The maintenance service 96 may ensure that the correct steps, or workflow, are followed when a user attempts to add, remove, update or alter any organizational information. For example, the maintenance service 96 may require that, before the coverage 48 is changed for an individual to specify that the individual covers, for example, ABC Client Corporation, a manager electronically consent to the change before the change is effected in the organizational information system 14. In another example, if the coverage 48 is going to be changed for an individual to specify that the individual is allowed to authorize cash payments, a individual specified in the organizational information system 14 as the owner of the role of authorization cash payments has to electronically approve the addition of the role of authorize cash payments for the individual to which it is to be associated.

Changes to roles and coverage in the organizational information database 500 that impact entitlements relating to the organizational information system 14 (e.g., changes to organizational information system maintenance roles and coverage) are propagated to the entitlements engine 16-3.

Figure 8:
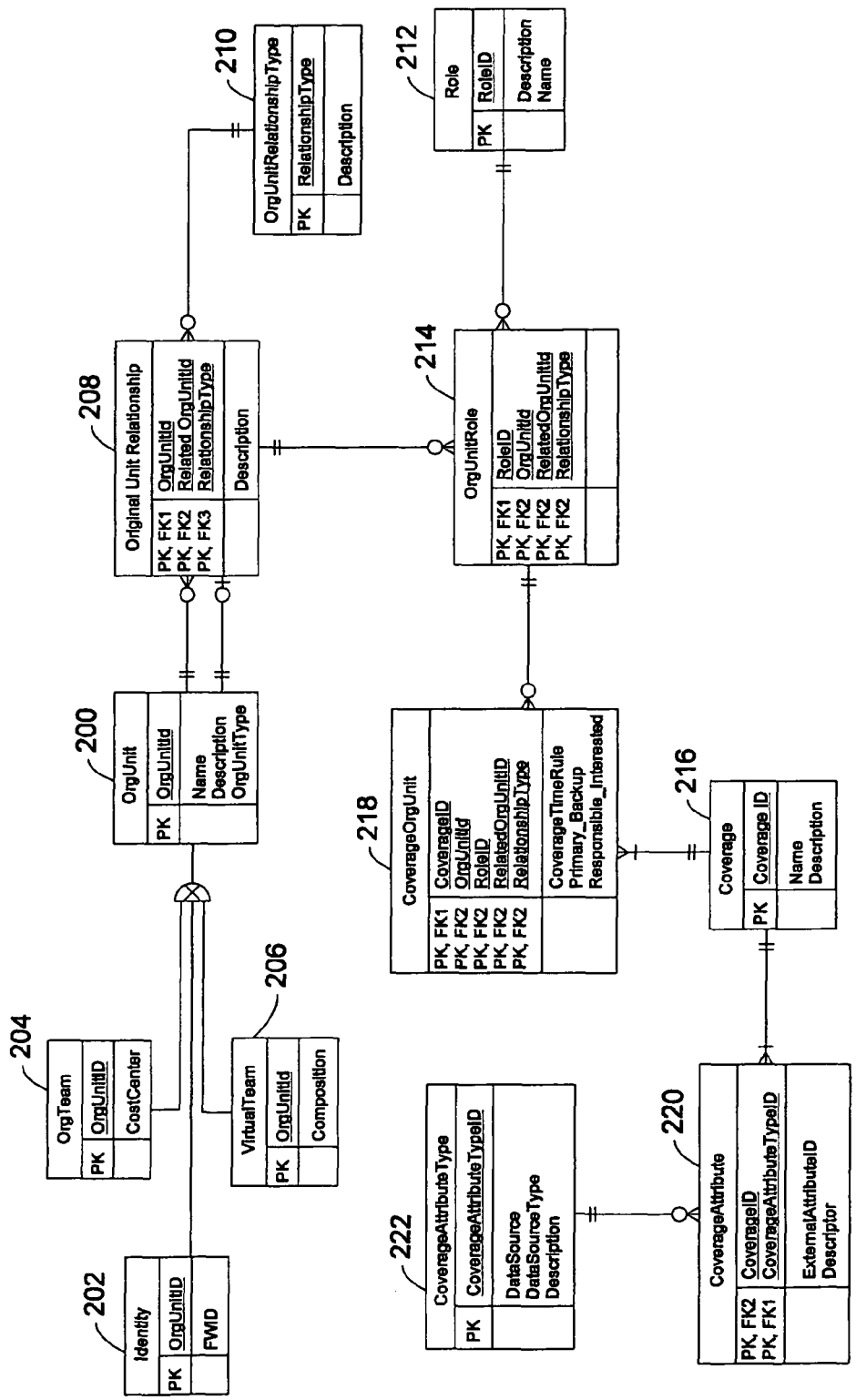
FIG. 8 illustrates a logical data model of organizational information according to one embodiment of the present invention.

FIG. 8 illustrates a logical data model of the organizational information database 500 according to one embodiment of the present invention. Data entities associated with the data structure are illustrated in the following tables.

TABLE 1

OrgUnit 200
This table shows information about the organizational units that the organization that utilizes the system 10 is comprised of.

| Column | Description |
|---|---|
| OrgUnitID | Unique identifier for an Organizational Unit |
| Name | Name of the Organizational Unit |
| Description | Brief description of the Organizational Unit |
| OrgUnitType | Identities, Organizational Teams and Virtual Teams in the subtype tables. |

TABLE 2

Identity 202
This table shows organizational information that is specific to identities.

| Column | Description |
|---|---|
| OrgUnitID | Unique identifier for a Organizational Unit |
| FWID | Firmwide Directory ID |

TABLE 3

OrgTeam 204
This table shows detailed information that is specific to organizational teams.

| Requirement | Description |
|---|---|
| OrgUnitID | Unique identifier for a Organizational Unit |
| CostCenter | The cost center for the Organizational Unit |

TABLE 4

VirtualTeam 206
This table shows detailed information that is specific to virtual teams.

| Requirement | Description |
|---|---|
| OrgUnitID | Unique identifier for a Organizational Unit |
| Composition | Describes if the Virtual Team is comprised of internal employees, external clients or mixed identities |

TABLE 5

OrgUnitRelationship 208
This table shows the nature of the relationship that may exist either between teams or between teams and identities. This can be used to capture parent-child hierarchies, relationship with contingent workforce team, team membership, the membership capacity of an identity on a particular team, etc.

| Requirement | Description |
|---|---|
| OrgUnitID | Unique identifier for a Organizational Unit |
| RelatedOrgUnitID | The organizational unit that OrgUnitID is related to |
| RelationshipType | Describes the type of relationship shared by the two organizational units |
| Description | Brief information about the organizational relationship |

TABLE 6

OrgUnitRelationshipType 210
This table shows the relationships two organizational units may share.

| Requirement | Description |
|---|---|
| RelationshipType | Describes the type of relationship shared by the two organizational units |
| Description | Brief information about the relationship type |

TABLE 7

Role 212
This table shows a list of assignable roles

| Requirement | Description |
|---|---|
| RoleID | Unique identifier for a role |
| Name | The name of the role |
| Description | Brief information about the role |

TABLE 8

OrgUnitRole 214
This table shows the role assigned to either an identity as a member of team or to a team as it relates to another team.

| Requirement | Description |
|---|---|
| OrgUnitID | Unique identifier for a Organizational Unit |
| RelatedOrgUnitID | The organizational unit that OrgUnitID is related to |
| RelationshipType | Describes the type of relationship shared by the two organizational units |
| RoleID | Unique identifier for a role |

TABLE 9

Coverage 216
This table shows the coverage records assignable to teams and identities.

| Requirement | Description |
| --- | --- |
| CoverageID | Unique identifier for a coverage record |
| Name | System generated name for the coverage record |
| Description | Brief information about the coverage record |

TABLE 10

CoverageOrgUnit 218
This table associates coverage records with an identity as a member of a team with a role or a team related to another team with a role.

| Requirement | Description |
| --- | --- |
| OrgUnitID | Unique identifier for a Organizational Unit |
| RelatedOrgUnitID | The organizational unit that OrgUnitID is related to |
| RelationshipType | Describes the type of relationship shared by the two organizational units |
| RoleID | Unique identifier for a role |
| CoverageID | Unique identifier for a coverage record |
| CoverageTimeRule | Stores the time and the periodicity of when the coverage is active |
| Primary_Backup | Stores the coverage capacity of being primary or backup |
| Responsible_Interested | Stores the coverage capacity of being responsible or interested |

TABLE 11

CoverageAttribute 220
This table stores the individual coverage attributes that comprise a coverage record.

| Requirement | Description |
| --- | --- |
| CoverageID | Unique identifier for a coverage record |
| CoverageTypeID | The source type of the coverage attribute |
| ExternalAttributeID | Unique identifier for a coverage attribute from an external data source |
| Descriptor | A system generated field describing the coverage attribute |

TABLE 12

CoverageAttributeType 222
This table contains a list of the coverage attribute data sources.

| Requirement | Description |
| --- | --- |
| CoverageTypeID | The source type of the coverage attribute |
| Data Source | Unique identifier for a coverage attribute in the data source |
| DataSourceType | The application type of the resource - e.g., Sybase, DB/2, LDAP |
| Description | Brief information about the coverage type |

Figure 9:
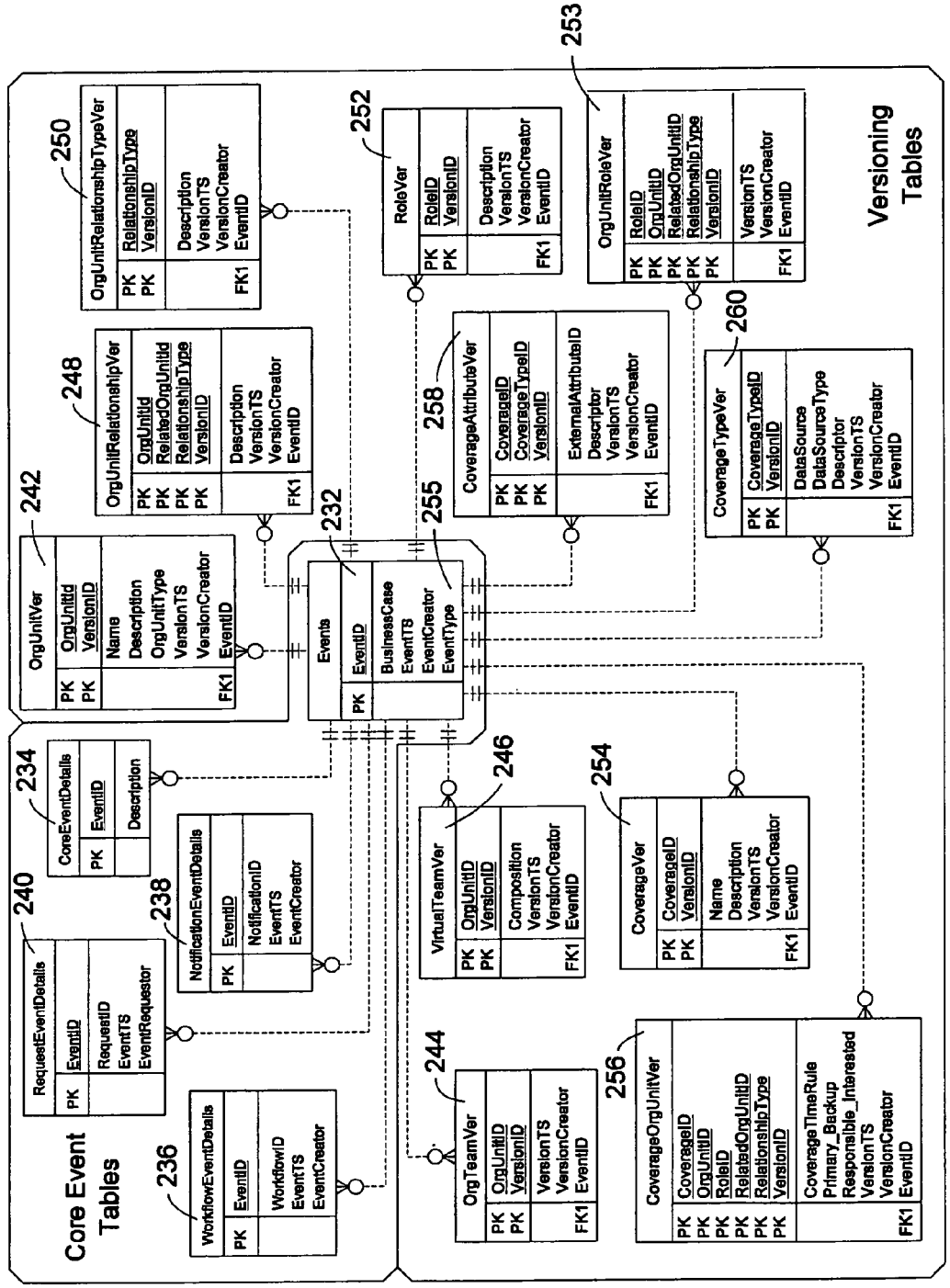
FIG. 9 illustrates a logical data model of an audit database that is used by the organizational information system according to one embodiment of the present invention.

FIG. 9 illustrates a logical data model of an audit database that is used by the organizational information system 14 according to one embodiment of the present invention. The data model of FIG. 9 provides a graphical representation of various data entities that may be required to support the creation of an audit trail within the organizational information system 14. An audit database 230 may be co-located with the organizational information database 500 and may be a repository of tables that is responsible for capturing events and their corresponding details.

Table 13 lists events that may be captured within the audit database 230 to enable accurate and efficient creation of audit trails for all organizational information system 14 functionality.

TABLE 13

Audit Events

Events

Disabling of an identity
New role assignment to an identity
Removal of role assignment from an identity
New relationship assignment to an identity
Update of relationship assigned to an identity
Removal of relationship assigned to an identity
New relationship assignment to a team
Update relationship assigned to a team
Removal of relationship assigned to a team
Update of team details (composition, cost center, etc.)
New role assignment to a team
Removal of role assignment from a team
New relationship type
Removal of an existing relationship type
New role created
Removal of a role
Update of Coverage Details
New Coverage Attribute
Removal of Coverage Attribute
Modification of Coverage Attribute
New Coverage Attribute type
Update of existing Coverage Attribute Type
Removal of Coverage Attribute Type
Workflow initiated
Workflow step initiated
Workflow step completion
Workflow completion
Sending of Notification
Entitlements The following tables provide an explanation of various entities that are outlined in the audit log logical data model of FIG. 9, as well as providing a sample set of attributes for illustration.

TABLE 14

Events 234
This table logs all of the system events that may occur in the organizational information system 14. Each Event ID 232 may tie into multiple versions of audited entities. Each version represents a separate insert, update or delete operation within the organizational information system 14.

| Requirement | Description |
| --- | --- |
| EventID | Unique identifier for organizational information system system event |
| BusinessCase | Descriptor explaining the business case for each event |
| EventTS | Timestamp of when the event was initiated |
| EventCreator | The FWID of the initiator of the event |
| EventType | Unique identifier for the different event types that may occur within the organizational information system |

TABLE 15

EventType 255
This table stores detailed information for core organizational information system 14 events 234.

| Requirement | Description |
| --- | --- |
| EventType | Unique identifier for the different event types that may occur within the organizational information system |

TABLE 15-continued

EventType 255
This table stores detailed information for core
organizational information system 14 events 234.

| Requirement | Description |
|---|---|
| Description | Information on the nature of the organizational information system system event type |

TABLE 16

WorkflowEventDetails 236
This table captures the workflow events 236 issued
by the organizational information system 14.

| Requirement | Description |
|---|---|
| EventID | Unique identifier for organizational information system system event |
| WorkflowID | Unique identifier for workflow events |
| EventTS | Timestamp of when the workflow event was initiated |
| EventCreator | The FWID of the initiator of the workflow event |

TABLE 17

NotificationEventDetails 238
This table captures the Notification events 238
issued by the organizational information system 14.

| Requirement | Description |
|---|---|
| EventID | Unique identifier for organizational information system system event |
| NotificationID | Unique identifier for notification events |
| EventTS | Timestamp of when the notification event was initiated |
| EventCreator | The FWID of the initiator of the notification event |

TABLE 18

RequestEventDetails 240
This table captures the Request events 240 initiated by requesting systems.

| Requirement | Description |
|---|---|
| EventID | Unique identifier for organizational information system system event |
| RequestID | Unique identifier for request events |
| EventTS | Timestamp of when the request event was initiated |
| EventRequestor | The FWID of the initiator of the request event |

TABLE 19

OrgUnitVer 242
This table captures the OrgUnit entity 242 and adds
columns for data versioning and event auditing.

| Column | Description |
|---|---|
| OrgUnitID | Unique identifier for a Organizational Unit |
| Name | Name of the Organizational Unit |
| Description | Brief description of the Organizational Unit |
| OrgUnitType | Identities, Organizational Teams and Virtual Teams in the subtype tables. |
| VersionID | Unique identifier for the version |
| EventID | Unique identifier for organizational information system system event |
| VersionTS | Timestamp of when the version was created |
| VersionCreator | The FWID of the creator of the version |

TABLE 20

IdentityVer (not shown in FIG. 9)
This table captures the Identity entity and adds
columns for data versioning and event auditing.

| Column | Description |
|---|---|
| OrgUnitID | Unique identifier for a Organizational Unit |
| FWID | Firmwide Directory ID |
| VersionID | Unique identifier for the version |
| EventID | Unique identifier for organizational information system system event |
| VersionTS | Timestamp of when the version was created |
| VersionCreator | The FWID of the creator of the version |

TABLE 21

OrgTeamVer 244
This table captures the OrgTeam entity 244 and adds
columns for data versioning and event auditing.

| Requirement | Description |
|---|---|
| OrgUnitID | Unique identifier for a Organizational Unit |
| CostCenter | The cost center for the Organizational Unit |
| VersionID | Unique identifier for the version |
| EventID | Unique identifier for organizational information system system event |
| VersionTS | Timestamp of when the version was created |
| VersionCreator | The FWID of the creator of the version |

TABLE 22

VirtualTeamVer 246
This table captures the VirtualTeam entity 246 and
adds columns for data versioning and event auditing.

| Requirement | Description |
|---|---|
| OrgUnitID | Unique identifier for a Organizational Unit |
| Composition | Describes if the Virtual Team is comprised of internal organization employees, external clients or mixed identities |
| VersionID | Unique identifier for the version |
| EventID | Unique identifier for organizational information system system event |
| VersionTS | Timestamp of when the version was created |
| VersionCreator | The FWID of the creator of the version |

TABLE 23

OrgUnitRelationshipVer 248
This table captures the OrgUnitRelationship entity 248
and adds columns for data versioning and event auditing.

| Requirement | Description |
|---|---|
| OrgUnitID | Unique identifier for a Organizational Unit |
| RelatedOrgUnitID | The organizational unit that OrgUnitID is related to |
| RelationshipType | Describes the type of relationship shared by the two organizational units |
| Description | Brief information about the organizational relationship |
| VersionID | Unique identifier for the version |
| EventID | Unique identifier for organizational information system system event |
| VersionTS | Timestamp of when the version was created |
| VersionCreator | The FWID of the creator of the version |

TABLE 24

OrgUnitRelationshipTypeVer 250
This table captures the OrgUnitRelationshipType entity 250
and adds columns for data versioning and event auditing.

| Requirement | Description |
| --- | --- |
| RelationshipType | Describes the type of relationship shared by the two organizational units |
| Description | Brief information about the relationship type |
| VersionID | Unique identifier for the version |
| EventID | Unique identifier for organizational information system system event |
| VersionTS | Timestamp of when the version was created |
| VersionCreator | The FWID of the creator of the version |

TABLE 25

RoleVer252
This table captures the Role entity 252 and adds
columns for data versioning and event auditing.

| Requirement | Description |
| --- | --- |
| RoleID | Unique identifier for a role |
| Name | The name of the role |
| Description | Brief information about the role |
| VersionID | Unique identifier for the version |
| EventID | Unique identifier for organizational information system system event |
| VersionTS | Timestamp of when the version was created |
| VersionCreator | The FWID of the creator of the version |

TABLE 26

OrgUnitRoleVer 253
This table captures the OrgUnitRoleVer entity 253 and
adds columns for data versioning and event auditing.

| Requirement | Description |
| --- | --- |
| OrgUnitID | Unique identifier for a Organizational Unit |
| RelatedOrgUnitID | The organizational unit that OrgUnitID is related to |
| RelationshipType | Describes the type of relationship shared by the two organizational units |
| RoleID | Unique identifier for a role |
| VersionID | Unique identifier for the version |
| EventID | Unique identifier for organizational information system system event |
| VersionTS | Timestamp of when the version was created |
| VersionCreator | The FWID of the creator of the version |

TABLE 27

CoverageVer 254
This table captures the Coverage entity 254 and adds
columns for data versioning and event auditing.

| Requirement | Description |
| --- | --- |
| CoverageID | Unique identifier for a coverage record |
| Name | System generated name for the coverage record |
| Description | Brief information about the coverage record |
| VersionID | Unique identifier for the version |
| EventID | Unique identifier for organizational information system system event |
| VersionTS | Timestamp of when the version was created |
| VersionCreator | The FWID of the creator of the version |

TABLE 28

CoverageOrgUnitVer 256
This table captures the CoverageOrgUnit entity 256 and
adds columns for data versioning and event auditing.

| Requirement | Description |
| --- | --- |
| OrgUnitID | Unique identifier for a Organizational Unit |
| RelatedOrgUnitID | The organizational unit that OrgUnitID is related to |
| RelationshipType | Describes the type of relationship shared by the two organizational units |
| RoleID | Unique identifier for a role |
| CoverageID | Unique identifier for a coverage record |
| CoverageTimeRule | Stores the time and the periodicity of when the coverage is active |
| Primary_Backup | Stores the coverage capacity of being primary or backup |
| Responsible_Interested | Stores the coverage capacity of being responsible or interested |
| VersionID | Unique identifier for the version |
| EventID | Unique identifier for organizational information system system event |
| VersionTS | Timestamp of when the version was created |
| VersionCreator | The FWID of the creator of the version |

TABLE 29

CoverageAttributeVer 258
This table captures the CoverageAttributeVer entity 258
and adds columns for data versioning and event auditing.

| Requirement | Description |
| --- | --- |
| CoverageID | Unique identifier for a coverage record |
| CoverageTypeID | The source type of the coverage attribute |
| ExternalAttributeID | Unique identifier for a coverage attribute from an external data source |
| Descriptor | A system generated field describing the coverage attribute |
| VersionID | Unique identifier for the version |
| EventID | Unique identifier for organizational information system system event |
| VersionTS | Timestamp of when the version was created |
| VersionCreator | The FWID of the creator of the version |

TABLE 30

CoverageTypeVer 260
This table captures the CoverageAttributeTypeVer 260 entity
and adds columns for data versioning and event auditing.

| Requirement | Description |
| --- | --- |
| CoverageTypeID | The source type of the coverage attribute |
| Data Source | Unique identifier for a coverage attribute in the data source |
| DataSourceType | The application type of the resource - e.g., Sybase, DB/2, LDAP |
| Description | Brief information about the coverage type |
| VersionID | Unique identifier for the version |
| EventID | Unique identifier for organizational information system system event |
| VersionTS | Timestamp of when the version was created |
| VersionCreator | The FWID of the creator of the version |

Figure 10:
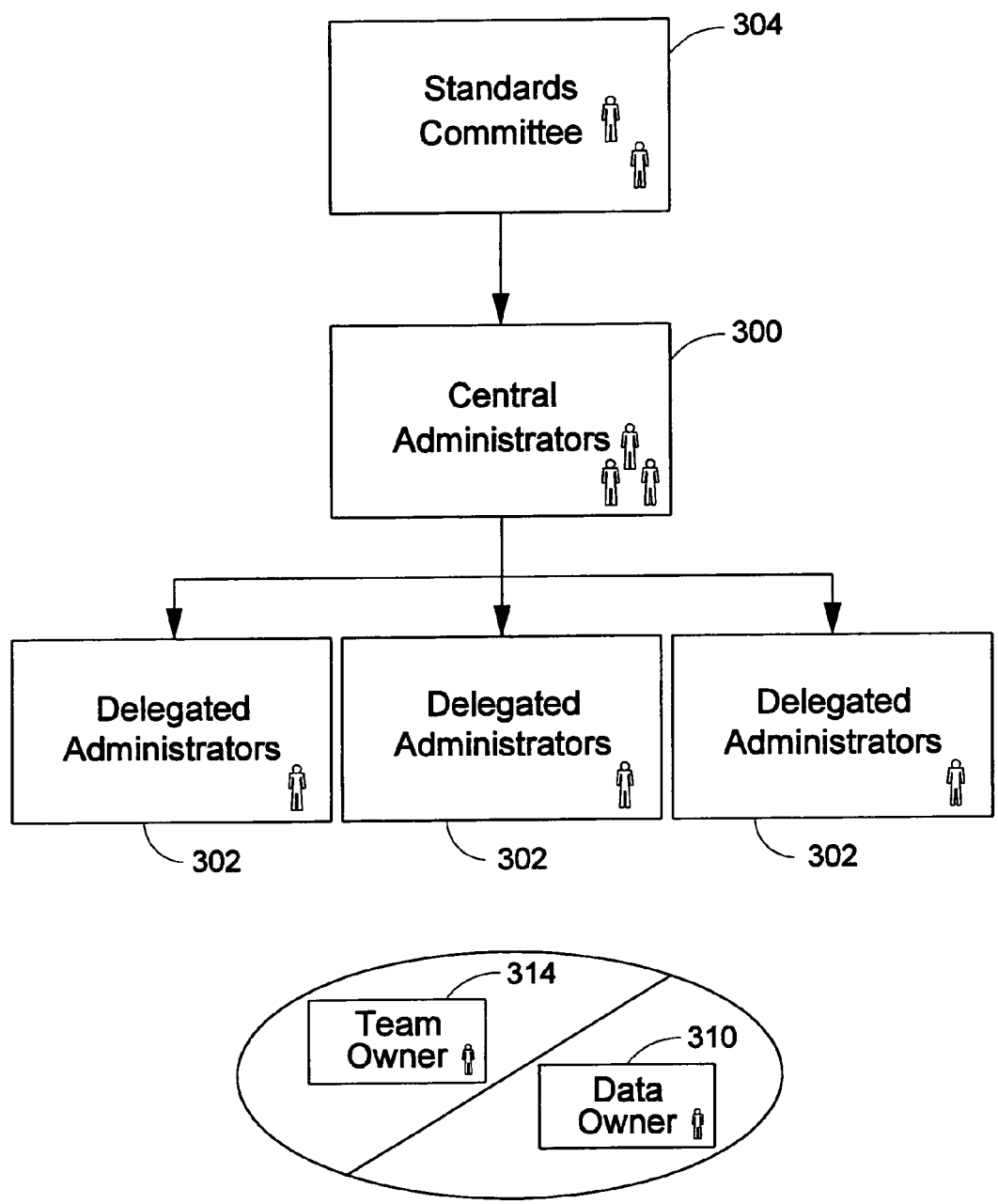
FIG. 10 illustrates an organizational design of an organizational data maintenance organization according to one embodiment of the present invention.

FIG. 10 illustrates an organizational design of a data maintenance organization according to one embodiment of the present invention. The data maintenance organization ensures data integrity by distributing administration responsibilities to users that are dependent on the accuracy of the data.

A Central Administration group 300 has the ultimate responsibility for reference data maintenance. As "super users" of the organizational information system maintenance service 96, the Central Administration group 300 delegates administration responsibilities and privileges to Delegated Administrators 302 across the organizational information system 14 user population. The responsibilities of the Central Administration group 300 are outlined in Table 31.

TABLE 31

| Role | Responsibility |
| --- | --- |
| Central Administrator | Create groups and assign coverage based on any set of available attributes. |
| | Delegate group administration to various business units and geographies. |
| | Define restrictions around group creation, such as which attributes can be used to define coverage. |
| | Add reference data identities to groups |
| | Administer reference data roles and attributes |
| Central Administration Manager | Organizational information system Super user |
| | Create new central administrators |

The responsibilities of Data Owners 310 are outlined in Table 32.

TABLE 32

| Role | Responsibility |
| --- | --- |
| Central Standards Review Group | Ensure that standards in the definition of rules, use of coverage and definition of teams are in place. |
| Role Standards Group | Sub-set of the Central Standards Review Group |
| | Ensure role standardization by reviewing and granting or denying new role requests. |
| Role Owner | Define business rules around and control access to the roles available for assignment to identities and teams. |
| Data Owner | Approve team membership requests for teams covering highly sensitive data. |
| | Approve requests to assign coverage of highly sensitive data |

In order to optimize the data maintenance process, administration capabilities may be delegated across the organizational information system user population. Delegated Administrators 302 may be granted full rights to administer those teams within their realm of delegation. The responsibilities of Team Owners 314 are outlined in Table 33.

TABLE 33

| Role | Responsibility |
| --- | --- |
| Delegated Administrator | Create and maintain groups (including assigning coverage) within their realm of delegation. |
| | Further delegate group administration within their realm of delegation |
| | Delegate identity administration to team owners |
| | Assign replacements when team owners leave the organization. |
| Delegated Administrators in each group cost center | Maintain organizational groups in reference data within their cost center. |
| | Further delegate group administration |
| Delegated Administrators in non-group cost centers | Maintain organizational groups in reference data within their cost center |
| | Further delegate group administration |
| Team Owner | For each team in reference data, virtual or organizational, there will need to be two team owners. |
| | Approve access to their team |
| | Manage their team membership, including coverage. |
| | Require additional approval from data owners and line managers when appropriate |

TABLE 33-continued

| Role | Responsibility |
| --- | --- |
| Line Managers/Officers | Grant an identity access to certain organizational and virtual teams, in addition to or instead of Team Owner approval |
| Relationship Managers | Grant an identity (specifically, a client contact) access to certain virtual teams, in addition to or instead of Team Owner approval |

Self-maintenance allows for real-time team membership updates. All organizational information system 14 users may have a role in the data maintenance organization as requestors, initiating the team enrollment process as outlined in Table 34.

| Role | Responsibility |
| --- | --- |
| Self Maintenance | Add and remove themselves to non-secure virtual teams |
| Requestor | Request to be added to coverage groups |
| | Request on behalf of someone for that individual to be added to a coverage group. |

Figures 11, 12:
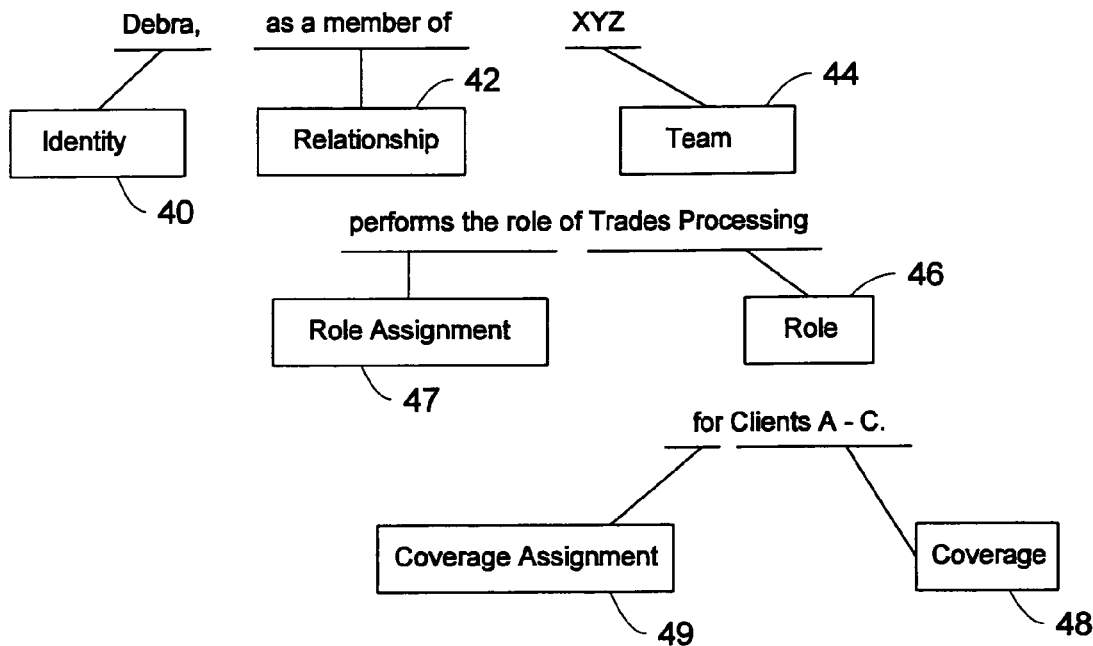
FIGS. 11 and 12 illustrate an example of high level organizational information according to one embodiment of the present invention.

FIGS. 11 and 12 illustrate an example of high-level reference data according to one embodiment of the present invention. The example of FIGS. 11 and 12 use the high level data design of FIG. 2. In FIGS. 11 and 12, a sentence analogy is used to demonstrate the assignment of coverage to an individual on the XYZ team, with a role of Trades Processing. As can be seen in FIGS. 11 and 12, coverage is assigned to the role 46 that a team 44 or individual has in the context of their relationship 42 to the team 44 on which they belong. Thus, as seen in FIGS. 11 and 12, Debra does not merely have coverage of Clients A-C, but rather covers Clients A-C as a member of the XYZ team, with the role of Trades Processing.

Figure 13:
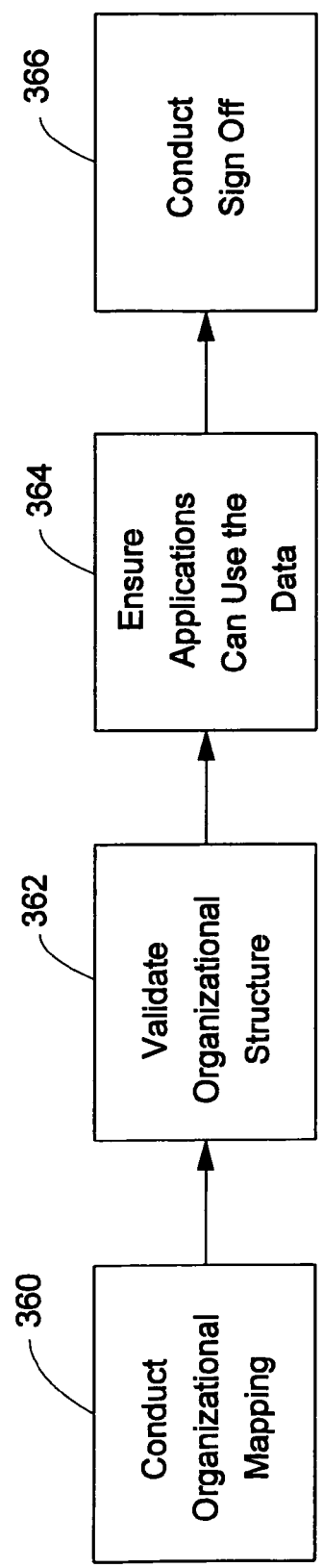
FIG. 13 illustrates a process of creating organizational information using the organizational information system according to one embodiment of the present invention.

FIG. 13 illustrates a process of mapping an organization using the organizational information system 14 according to one embodiment of the present invention. The organization may be, for example, a business unit, group, etc. or an entire corporation, entity, etc. that desires to use the system 10. At step 360, the organization is mapped into the organizational information system 14 by first defining the organization in terms of job activities and responsibilities. The organization is modeled in such a way that the organizational information system 14 can provide a centralized source of role and coverage data that is available to applications, users, etc. that use the system 10.

At step 362, the organizational structure is validated to confirm that the structure (including assignment of roles and coverage) conforms to various standards that the organizational data must follow. In one embodiment, steps 360 and 362 can be combined into one operation.

At step 364, a check is made to ensure that applications can use the organizational data that was created at step 360. At step 366, the organizational data is signed off on by, for example, administrators of the system 10, application owners, etc.

Figure 14:
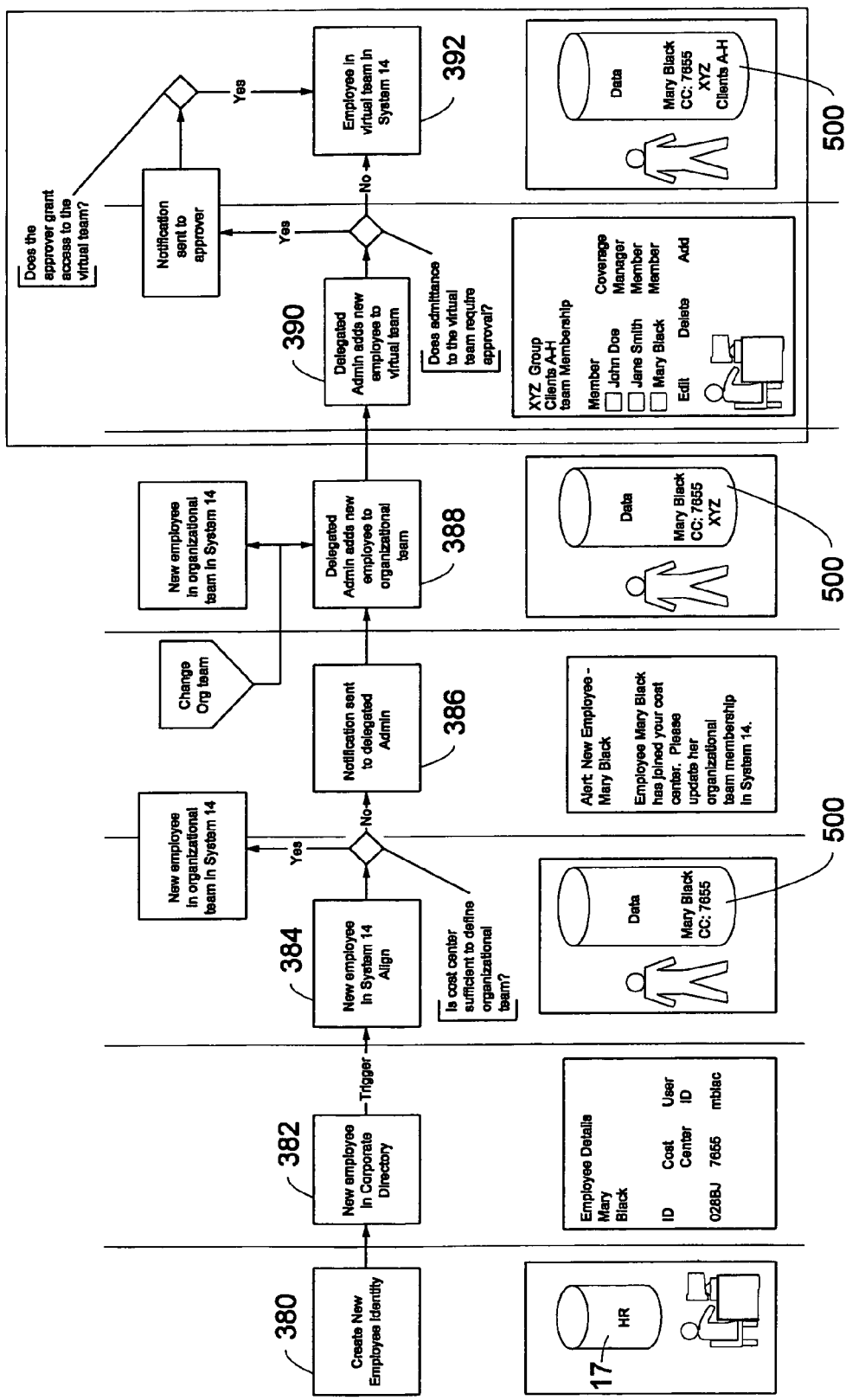
FIGS. 14 through 22 illustrate examples of use of the system of FIG. 1 according to various embodiments of the present invention.

FIGS. 14 through 22 illustrate examples of use of the system 10 of FIG. 1 according to various embodiments of the present invention. FIG. 14 illustrates an embodiment in which a new employee is added to the organizational information system 14. In the embodiment, a new employee, "Mary Black," has joined an organization and will be working in the XYZ group within the organization. At step 380, a new identity is added for Black in the HR database 17. The identity information includes Black's name, cost center and employee ID.

At step 382, Black's identity is added to the firmwide directory 20. At step 384, Black's identity is published to the organizational information system 14 and the identity is added to the organizational information and Black is aligned with her cost center. The update in the organizational information triggers a notification to the delegated administrator that is responsible for the cost center with which Black is associated at step 386. At step 388, the delegated administrator adds Black to the correct organization team (XYZ Group) and her role and coverage capacity are defined.

At step 390, the delegated administrator adds Black to a virtual team that covers clients A-H. As can be seen, admittance to various teams may require approval by an additional approver. At step 392, Black is now a member of client A-H virtual team in the organizational information system 14. In various embodiments, steps 390 and 392 may be repeated as necessary.

Figure 15:
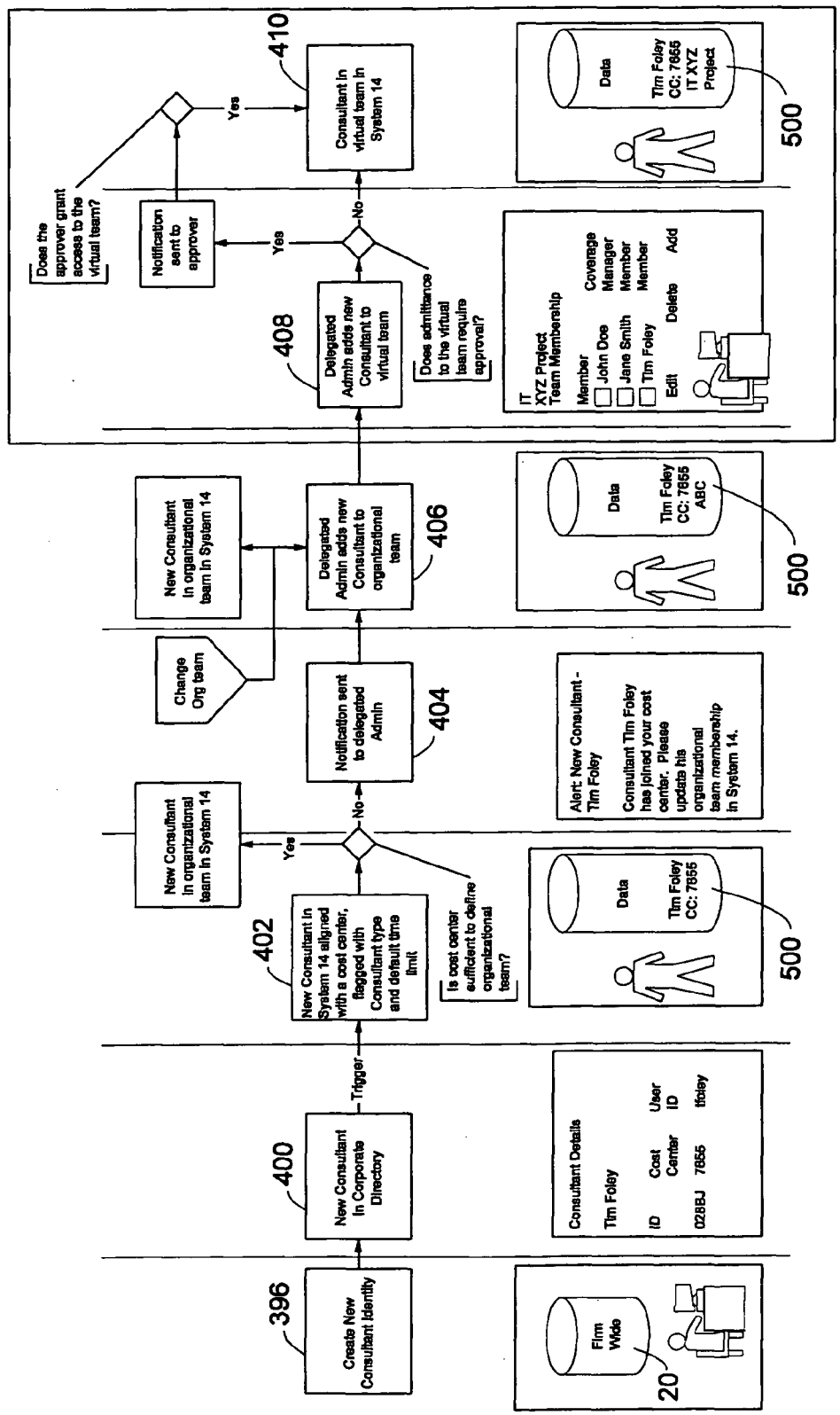

FIG. 15 illustrates an embodiment in which a contingent worker (e.g., a consultant) is added to the organizational information system 14. At step 396, a consultant with ABC Corp., "Tim Foley," is added to the firmwide directory 20. At step 400, the existence of an identity in the firmwide directory 20 has triggered creation of an identity in the firmwide directory 20 in which Foley is identified as a consultant.

At step 402, upon completion of an identity in the firmwide directory 20, the identity is published to the organizational information system 14. Foley is aligned with the appropriate cost center in the organizational information and is flagged as a consultant. In one embodiment, because Foley is a consultant, his identity in the organizational information system 14 automatically expires after a pre-determined period of time and manual intervention is required to extend residence of the identity in the organizational information system 14.

At step 404, the update in the organizational information system 14 triggers a notification to the delegated administrator that is responsible for the cost center with which Foley is associated. At step 406, the delegated administrator adds Foley to the ABC organizational team in the organizational information system 14. In one embodiment, an expiration date of Foley's membership in the team can be set. At step 408, the delegated administrator adds Foley to the appropriate virtual team (i.e. the XYZ team). As can be seen, admittance to various teams may require approval by an additional approver. At step 410, Foley is now a member of the XYZ project virtual team in the organizational information system 14. In various embodiments, steps 408 and 410 may be repeated as necessary.

Figure 16:
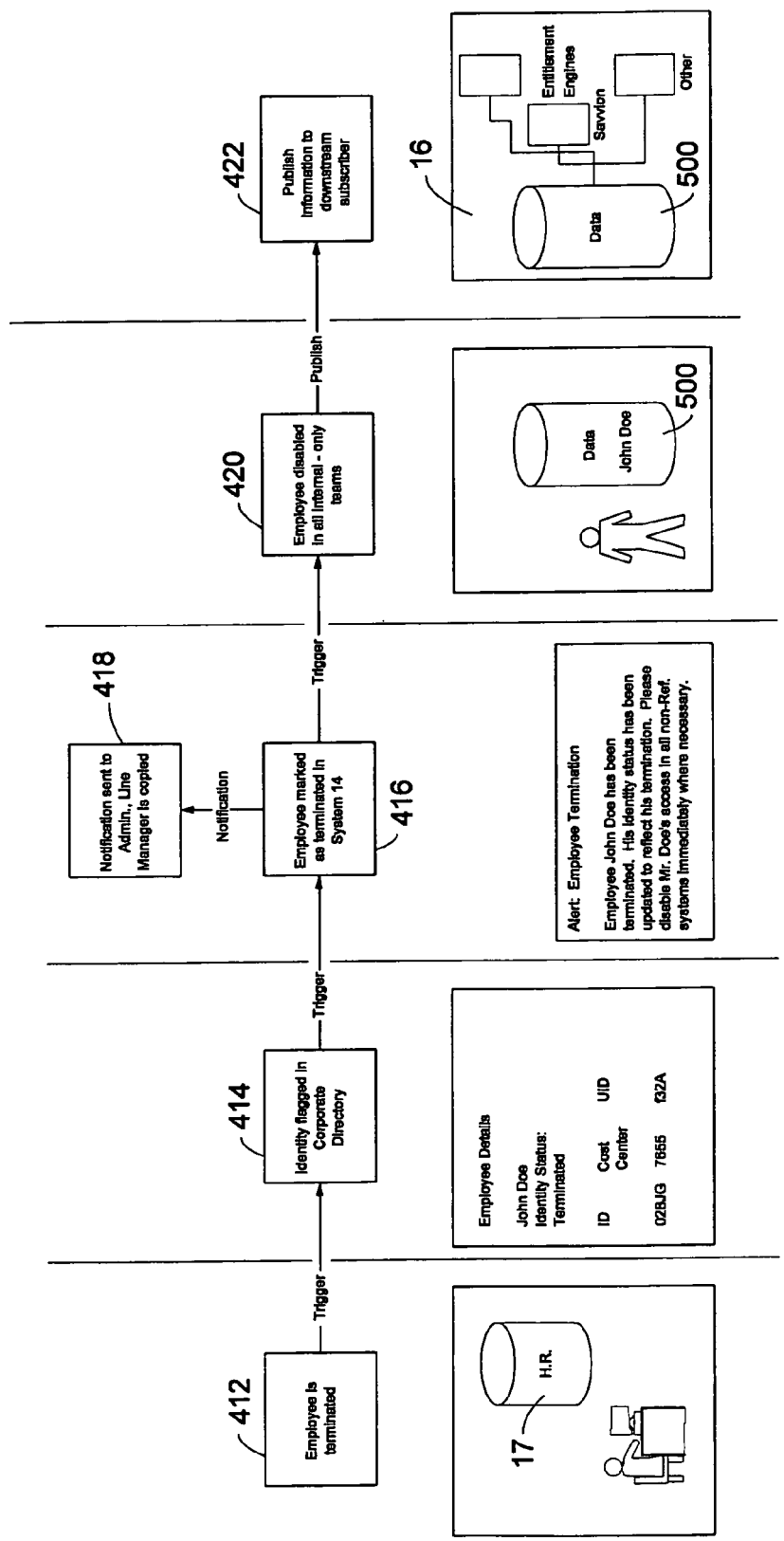

FIG. 16 illustrates an embodiment in which an employee is terminated and thus deactivated, or marked as terminated, in the organizational information system 14. As can be seen in FIG. 16, an employee, "John Doe," is terminated and his identity is updated to "terminated" in the HR database 17 at step 412. At step 414, Doe's identity is changed in the firmwide directory 20 to indicate that he has been terminated.

At step 416, the organizational information system 14 is triggered to mark Doe's identity as terminated. At step 418, the central administrator and the delegated administrator responsible for the cost center with which Does is associated are alerted of Doe's termination. In one embodiment, other individuals (e.g., line managers, etc.) are also notified of Doe's termination so that appropriate steps may be taken (e.g., disable Doe's access to certain resources, provide coverage for Doe's former responsibilities, etc.).

At step 420, Doe is disabled with respect to all teams in the organizational information system 14. At step 422, Doe's termination is published to other systems such as, for example, the entitlements engine 16.

Figure 17:
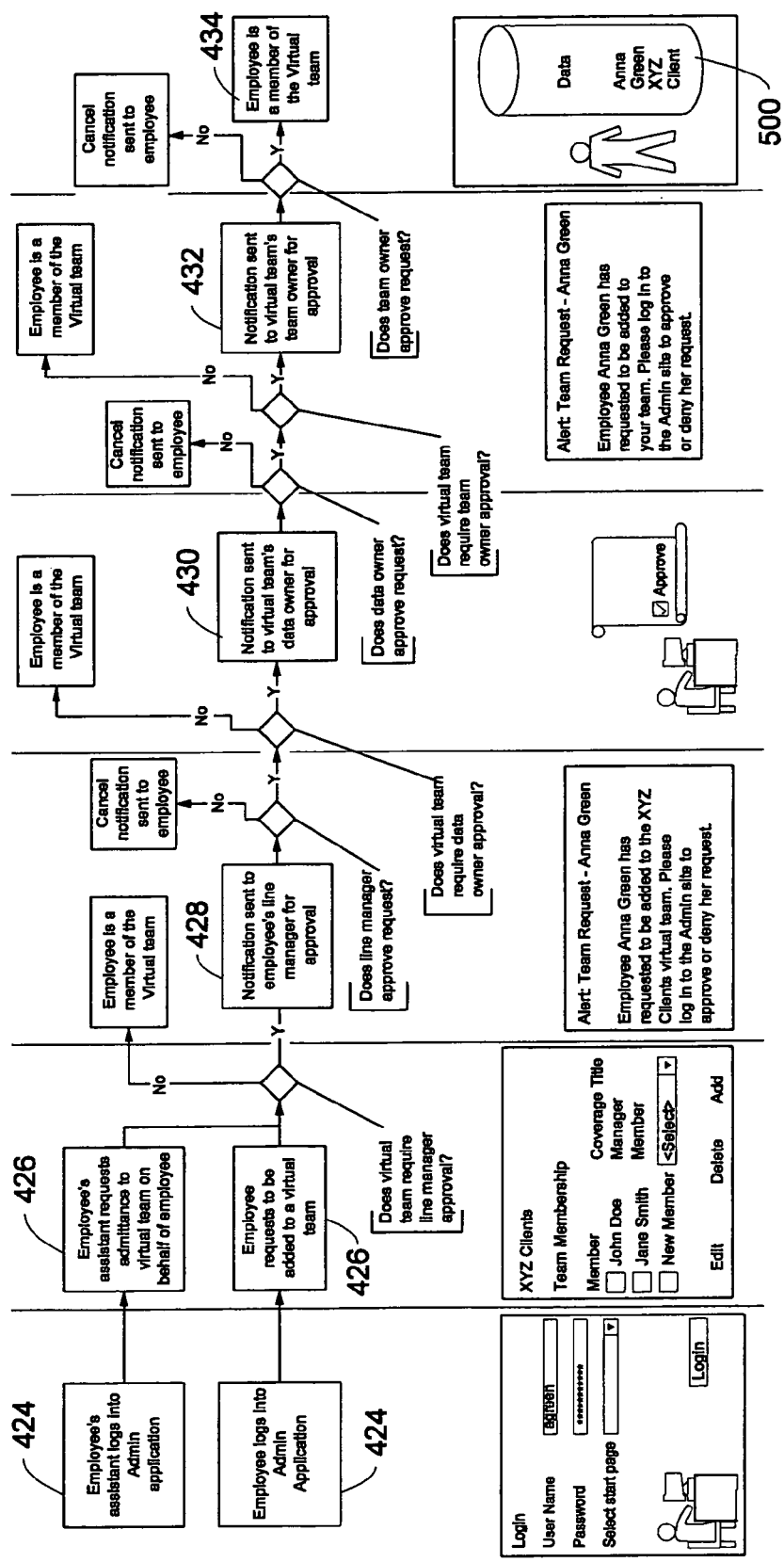

FIG. 17 illustrates an embodiment in which an employee requests, and is granted, admittance to a virtual team in the organizational information system 14. At step 424, an employee, "Anna Green," or the employee's assistant, logs into an organizational information system administration function to update her team membership. At step 426, either Green or her assistant request to be added to the XYZ client virtual team. If, as is the case in FIG. 17, such an addition requires approval (e.g., line manager approval), a notification is given to that effect to the employee (or the employee's assistant).

At step 428, notification is sent to Green's line manager requesting approval for Green to be added to the XYZ client team. If, as is the case in FIG. 17, the line manger grants such approval and further approvals are necessary, at step 430 a notification is sent to the virtual team's data owner. If, as is the case in FIG. 17, the virtual team's data owner grants approval, notification is sent to the virtual team's team owner requesting approval at step 432. At step 434, if the virtual team's team owner grants approval, Green is added as a member of the XYZ client virtual team in the organizational information system 14.

As can be seen in FIG. 17, various notifications may be sent to a requesting employee if approval is denied at various levels. Also, the process allows for varying levels of approval when, for example, less than two levels of approval are needed to allow an employee to update team membership.

Figure 18:
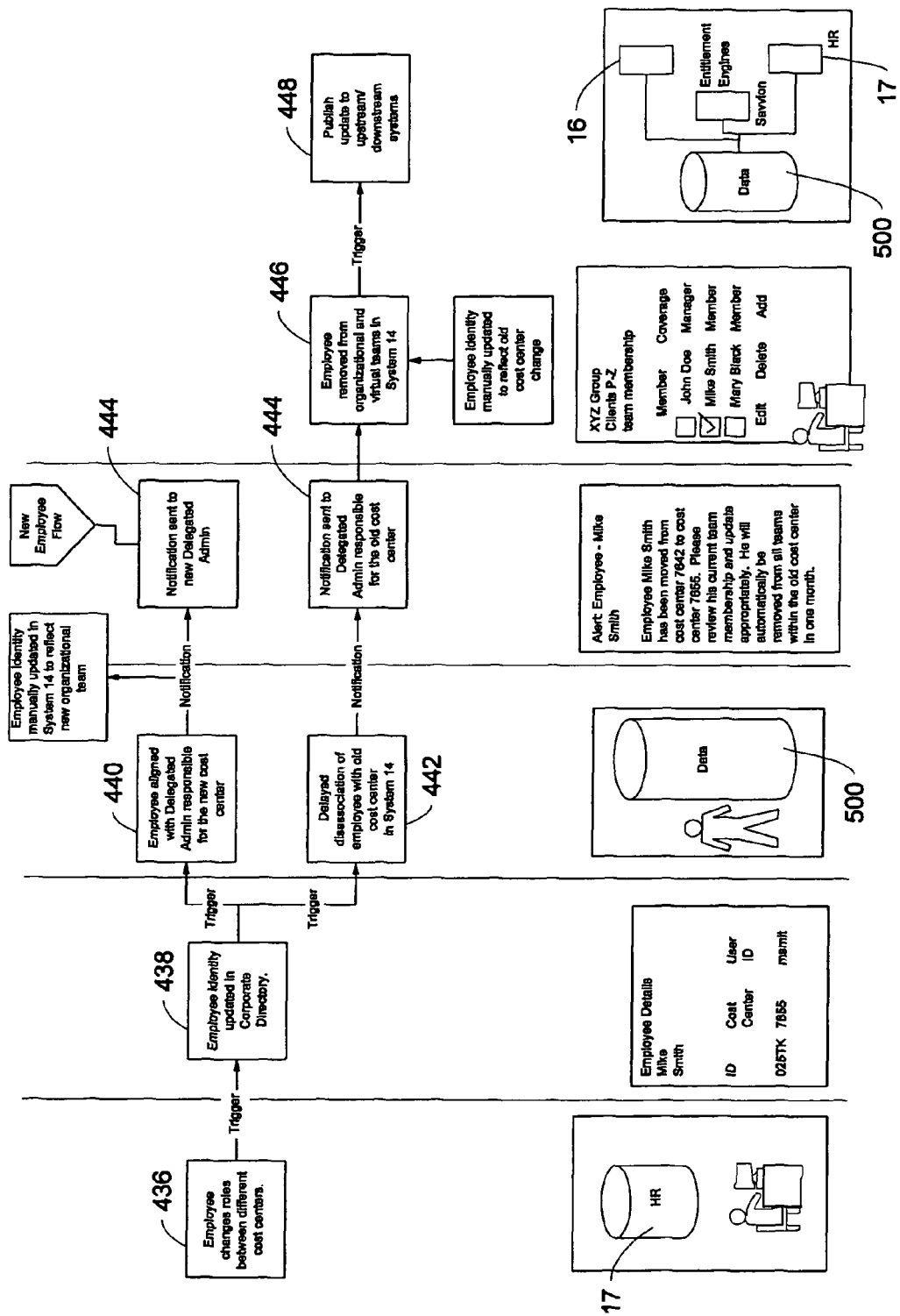

FIG. 18 illustrates an embodiment in which an employee makes an organizational change in the organizational information system 14. At step 426 an employee, "Mike Smith," has changed roles. The changed information for Smith is updated in the HR database 17. At step 438, the update of the HR database 17 triggers an update to the firmwide directory 20. At step 440, the organizational information system 14 is updated to reflect the new cost center for Smith. At step 442, a delayed disassociation of Smith with the former cost center occurs in the organizational information system 14.

At step 444, the delegated administrator of Smith's new cost center and the delegated administrator of Smith's former cost center are sent notifications that Smith will be disassociated with the former cost center. At step 446, Smith has been removed from all teams associated with the former cost center in the organizational information system 14 and, in one embodiment, Smith is notified of his removal from such teams.

At step 446, changes regarding Smith in the organizational information system 14 are published to, for example, downstream and upstream applications and systems that utilize the organizational information system 14. In one embodiment, if a cost center change is updated in the organizational information system 14 before it is updated in the HR database 17, the organizational information system 14 will publish the change to the HR database 17.

Figure 19:
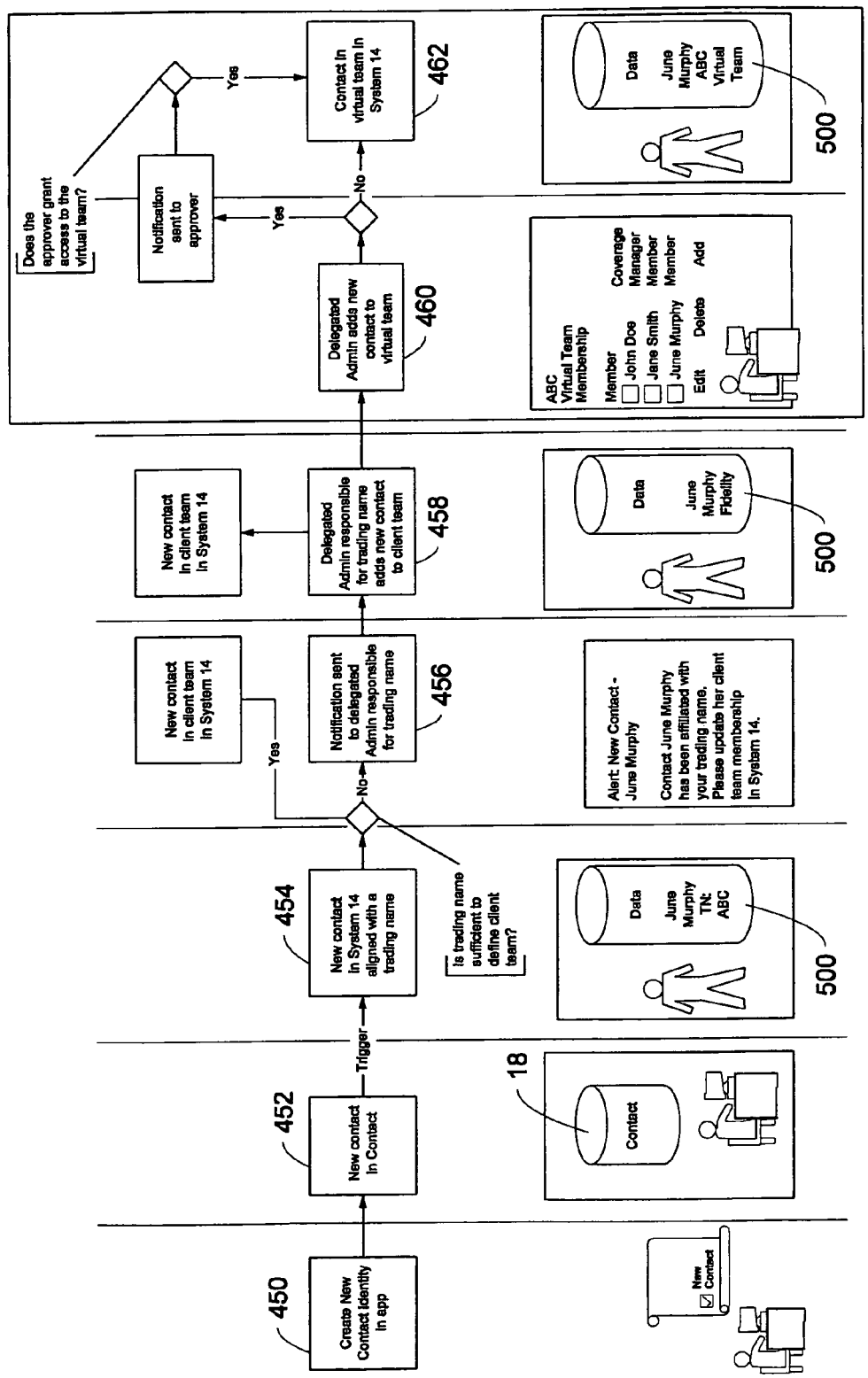

FIG. 19 illustrates an embodiment in which a new client contact is added in an application. At step 450, a new contact, "June Murphy," is added as a contact at ABC Corp. in an application. At step 452, Murphy is added as a contact in the contact database 18. At step 454, Murphy is aligned with the ABC Corp. in the organizational information system 14. At step 456, notification is sent to the delegated administrator that is responsible for the ABC Corp. In one embodiment, the relationship manager for the ABC Corp. relationship is also notified.

At step 458, the delegated administrator adds Murphy to the ABC Corp. client team in the organizational information system 14. At step 460, the delegated administrator adds Murphy to the ABC Corp. virtual team in the organizational information system 14. At step 462, Murphy is now a member of the ABC Corp. virtual team in the organizational information system 14. In various embodiments, steps 460 and 462 may be repeated as necessary.

Figure 20:
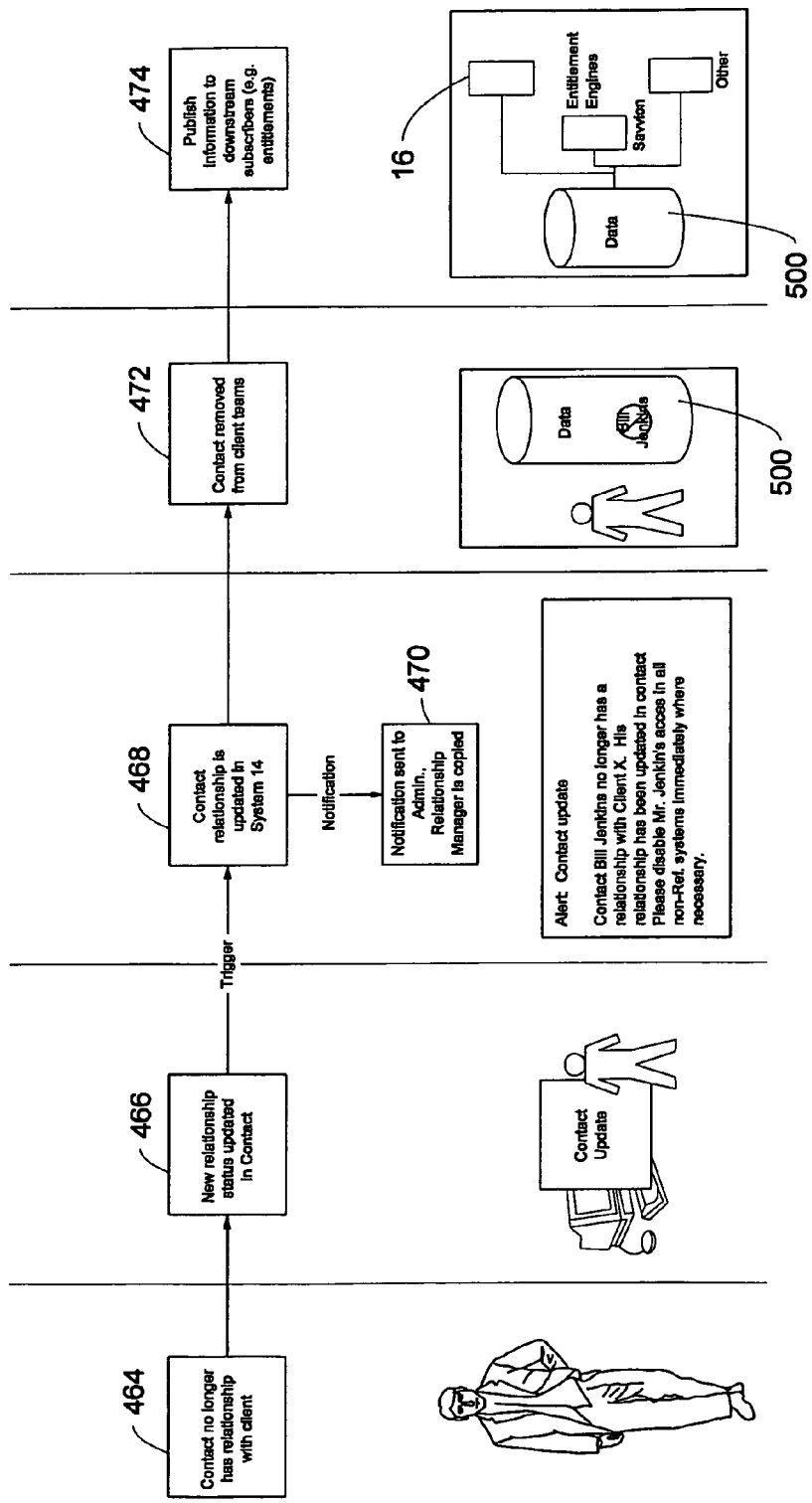

FIG. 20 illustrates an embodiment in which a contact's relationship with a client is terminated. At step 464, a contact, "Bill Jenkins," no longer has a relationship with client X, because, for example, his employment has been terminated or he has resigned. At step 466, the contact database 18 is updated to remove Jenkins' affiliation with client X. At step 468, the contact information for Jenkins is updated in the organizational information system 14 and at step 470, notification of the update is sent to the delegated administrator for client X and the relationship manager for client X.

At step 472, Jenkins is removed from all teams in the organizational information system 14. At step 474, the update to the organizational information system 14 is published to downstream systems and applications such as, for example, the entitlements engine 16.

Figure 21:
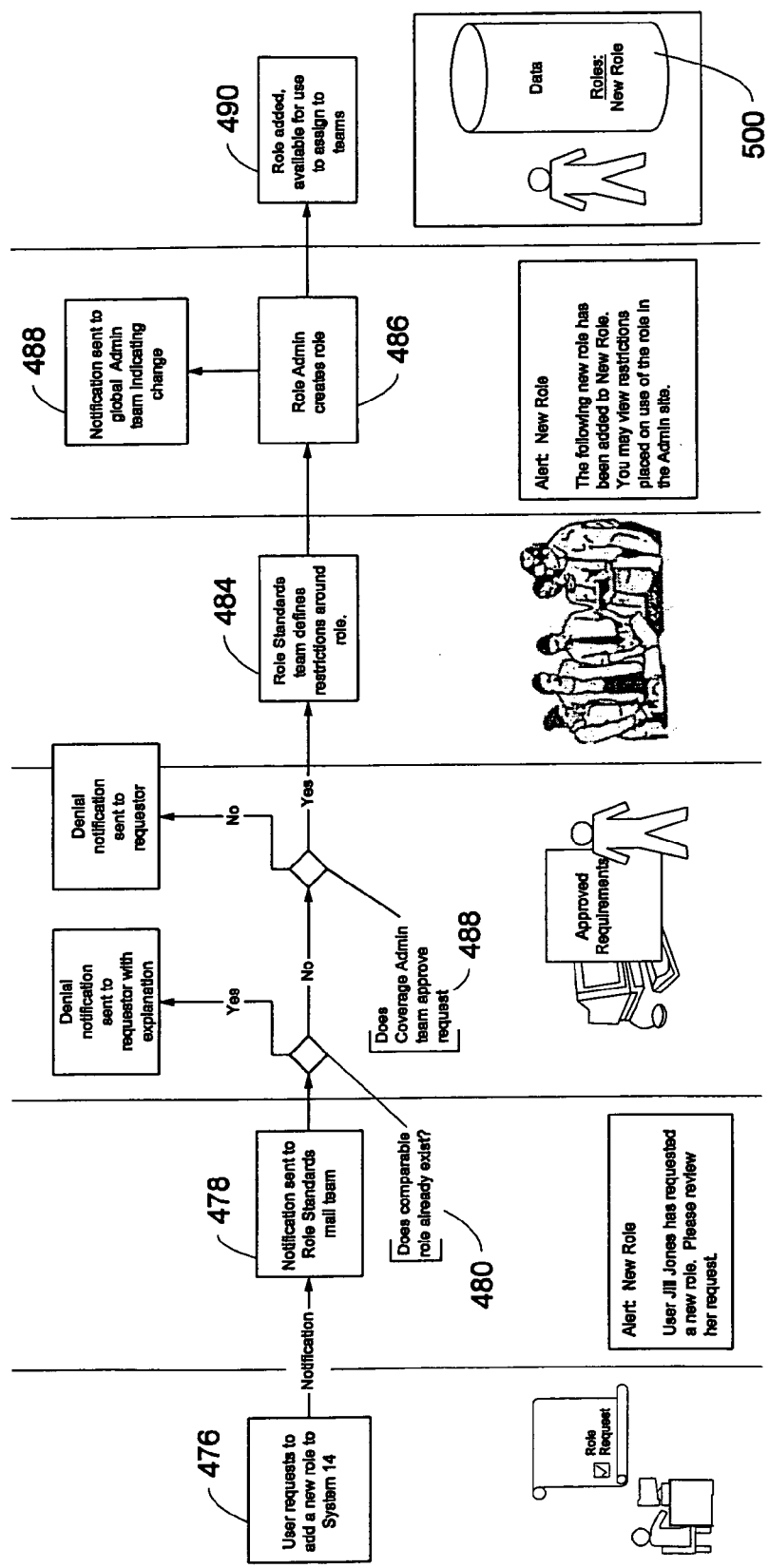

FIG. 21 illustrates an embodiment in which a new role is requested and added to the organizational information system 14. At step 476, a user, "Jill Jones," requests that a new role be added for use by teams in the organizational information system 14. At step 478, a notification of Jones' request is sent to a role standards team. The role standards team is responsible for reviewing all requests to modify existing roles, create new roles, and delete invalid roles.

At step 480, the role standards team confirms that no comparable role already exists and at step 482 approves addition of the new role. At step 484, the role standards team defines various restrictions relating to the new role. At step 486, the role administrator creates the role and at step 488, notification is sent to a global administrative team to alert the team of the existence of the new role. At step 490, the new role is available in the organizational information system 14.

Figure 22:
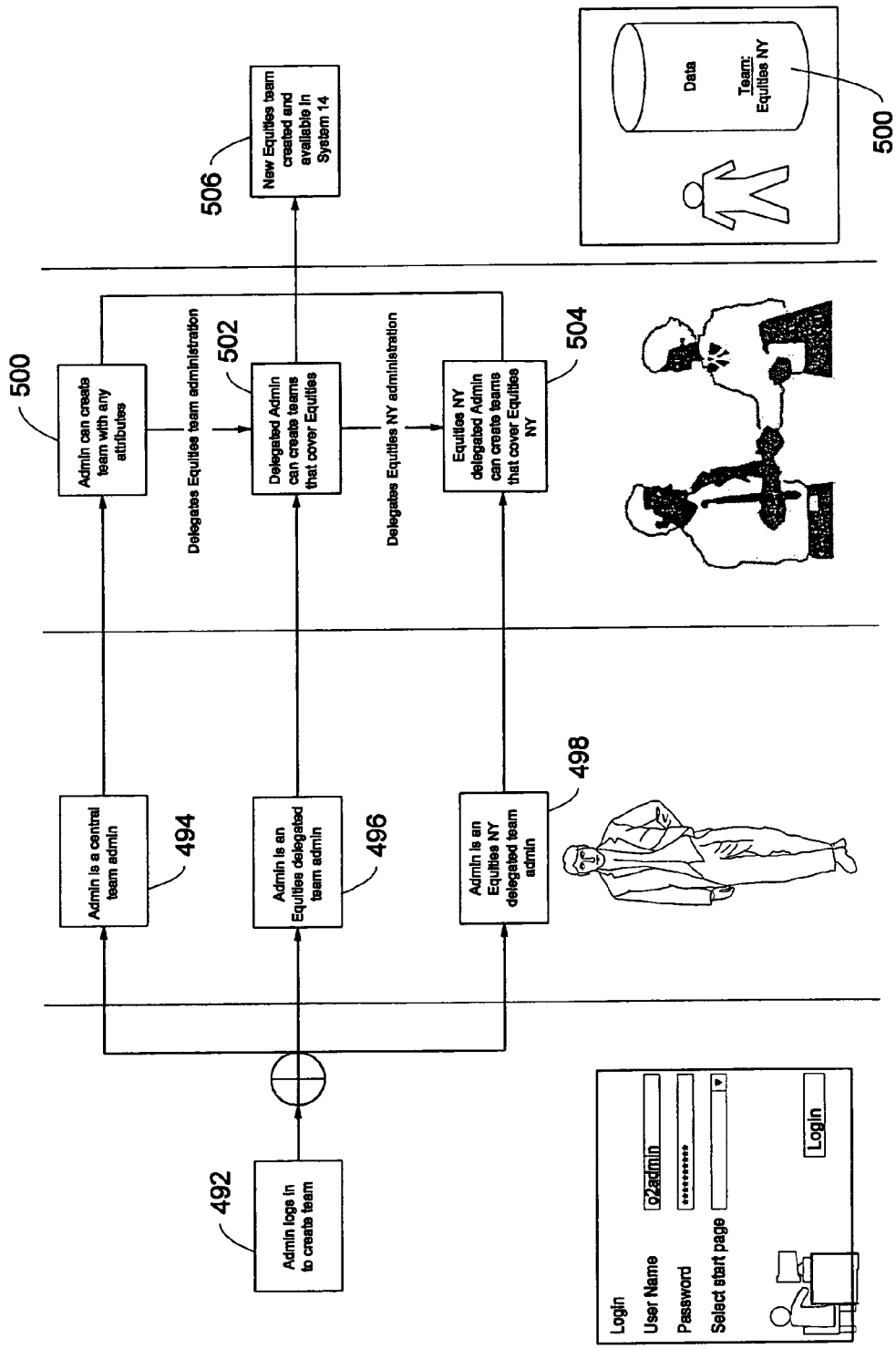

FIG. 22 illustrates an embodiment in which a new team is added to the organizational information system 14. At step 492, an administrator logs into maintenance service 96 to create the team. The administrator may be a central team administrator 494, a delegated team administrator for a team (e.g., the "Equities" team) 496, or a delegated team administrator for a sub-team (e.g., the "Equities NY" team) 498. The central team administrator 494 has the ability to create any team with any attributes. The delegated team administrator for a team 496 has the ability to create any team covering the team and any sub-teams. The delegated administrator for a sub-team 498 has the ability to create teams covering the sub-team. Such abilities are shown at steps 500, 502, 504. At step 506, the new team is created in the organizational information system 14.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to individuals skilled in the art with the attainment of some or all of the advantages of the present invention. It is therefore intended to cover all such modifications, alterations and adaptations without departing from the scope and spirit of the present invention as defined by the appended claims.

What is claimed is:

1. A computer-implemented entitlement system for controlling access to secured resources of an organization, the entitlement system comprising at least one processor and operatively associated data storage comprising instructions that, when executed by the at least one processor, cause the entitlement system to implement:

a computer-implemented organizational information system that manages and stores organizational data at an organizational information database, wherein the organizational data is stored in the organizational information database according to a logical data model that comprises:

user identities;

teams, wherein each team is associated with at least one of the user identities;

relationships, wherein each relationship defines a relationship between at least one of the user identities and at least one of the teams or between at least two of the teams;

roles, wherein each role defines a job function assigned to at least one of the teams or to at least one of the user identities; and coverages, wherein each coverage defines a scope of responsibility of at least one of the teams or of at least one of the user identities that is associated with at least one of the teams, with respect to an associated one of the roles, and wherein each coverage comprises one or more coverage attributes selected from at least one of data describing a line of business, a product, a client and a system;

a plurality of entitlements engines in electronic communication with the organizational information system, and with applications that use secured resources, and wherein each entitlements engine is configured to service at least one of the applications and comprises:

an entitlements database;

a store of business rules logic;

an integrator, wherein the integrator is programmed to:

read data from the organizational information system wherein the read data comprises user identity data, role data indicative of an assigned job function and coverage data indicative of an assigned scope of responsibility;

apply the business rules logic to the read data to create entitlement data, wherein the business rules logic specifies access policies that define, for at least one of the secured resources, an access policy based on a role selected from the roles and at least one of the coverages; and store the entitlement data in the entitlements database, wherein the entitlement data is indicative of a user, the at least one of the secured resources, and an action performed regarding the at least one of the secured resources; and wherein each of the plurality of entitlements engines is programmed to:
  receive a query from one of the applications requesting an indication of whether the user of the application is authorized to access at least one of the secured resources that is used by the application; and
  generate a response to the request considering the entitlement data.

2. The entitlement system of claim 1, wherein the integrator of each entitlements engine applies the business rules logic to data other than the data read from the organizational information system to create the entitlement data that is stored in the at least one entitlements database.

3. The entitlement system of claim 1, wherein at least one of the entitlements engines is programmed to determine whether an entitlements administrator is entitled to administer secured resources by making a request of itself.

4. The entitlement system of claim 1, wherein at least one of the entitlements engines is programmed to determine whether the organizational information system is itself entitled to access secured resources.

5. The entitlement system of claim 1, further comprising:
  a workflow application in communication with the organizational information system, wherein the workflow application uses data contained in the at least one organizational information database for routing items of work.

6. The entitlement system of claim 5, wherein the workflow application is one of a transaction event and an exception routing application.

7. The entitlement system of claim 1, wherein the organizational information system is in communication with a directory database that stores data relating to members in the organization, and is in communication with an account reference data database that stores data relating to accounts and account owners.

8. The entitlement system of claim 1, wherein the organizational information system is in electronic communication with one or more reporting applications programmed to generate one or more reports relating to the organization.

9. The entitlement system of claim 1, wherein the plurality of the applications in communication with at least one of the entitlements engines comprises a domain of applications.

10. The entitlement system of claim 1, wherein the teams are organizational teams or virtual teams.

11. The entitlement system of claim 1, wherein each of the coverages is associated with a coverage time defining a periodicity of coverage.

12. The entitlement system of claim 1, wherein each of the coverages is associated with a coverage capacity defining the coverage as at least one of primary and backup.

13. The entitlement system of claim 1, wherein the organizational information system is programmed to receive non-entitlement requests from the applications, wherein the non-entitlement requests comprises requests to identify one or more of at least one of the teams, at least one of the roles and at least one of the coverages.

14. The entitlement system of claim 1, wherein the organizational information system comprises a maintenance service that is programmed to validate requests made to change data stored in the organizational information system using at least one of the entitlements engines.

15. The entitlement system of claim 1, wherein changes to roles data or coverages data in the at least one organizational information database are propagated to at least one of the entitlements engines.

16. The entitlement system of claim 1, wherein each of the roles are assigned to a team selected from the teams or to at least one of the user identities with respect to its relationship to its associated team.

17. The entitlement system of claim 1, wherein each of the coverages is assigned to at least one role that is assigned to at least one of the teams or to at least one of the user identity identities with respect to its relationship to its associated team.

18. The entitlement system of claim 1, wherein the organization information system is in communication with at least one of a human resources database and a directory database, and wherein the organization information system is programmed to, upon receipt of data indicating a user's termination, mark the terminated user's identity as terminated.

19. The entitlement system of claim 18, wherein marking the terminated user's identity as terminated causes the terminated user to be disabled with respect to all teams in the organizational information system and causes the user's termination to be published to at least one of the entitlements engines.

20. The entitlement system of claim 1, wherein the organizational information system is in communication with a client contact database, and wherein the organization information system is programmed to, upon receipt of data indicating a client contact user's termination, remove the user's affiliation with the client.

21. The entitlement system of claim 20, wherein removing the user's affiliation with the client causes the terminated client contact user to be removed from all teams in the organizational information system and the update to be published to at least one of the entitlements engines.

22. A computer-implemented method for controlling access to secured resources of an organization the method comprising:
  storing, in a data model of at least one organizational information database of a computer-implemented organizational information system, organizational data comprising:
    user identities;
    teams, wherein each team is associated with at least one of the user identities;
    relationships, wherein each relationship defines a relationship between at least one of the user identities and at least one of the teams or between at least two of the teams;
    roles, wherein each role defines a job function assigned to at least one of the teams or to at least one of the user identities; and
    coverages, wherein each coverage defines a scope of responsibility of at least one of the teams or of at least one of the user identities that is associated with at least one of the teams, with respect to an associated one of the roles, and wherein each coverage comprises one or more coverage attributes selected from at least one of data describing a line of business, a product, a client and a system;
  in each of a plurality of entitlements engines that is implemented using at least one programmed computer and in electronic communication with the organizational information system, and at least one application that uses secured resources, wherein each entitlements engine is configured to service at least one of the applications, and wherein at least one of the entitlements engines is in electronic communication with a plurality of the applications:

determining whether users of the entitlement system are entitled to access secured resources via the applications based on the entitlement data stored in the corresponding at least one entitlements database, wherein the determining comprises:
  receiving one or more entitlement requests to access secured resources from at least one application in communication with the entitlements engine, wherein at least one of the entitlements engines receives entitlement requests from the plurality of the applications; and
  determining in response to the one or more entitlement requests whether the users associated with the one or more entitlement requests are entitled to access secured resources via the at least one application based on the entitlement data stored in the at least one entitlements database; and
  implementing an integrator in electronic communication with at least one entitlements database, and a store of business rules logic, wherein the integrator is programmed to:
  read data from the organizational information system, wherein the read data comprises user identity data, role data and coverage data;
  apply the business rules logic to the read data to create entitlement data that is stored in the least one entitlements database of the entitlements engine, wherein the business rules logic specifies access policies that define, for at least one of the secured resources, an access policy based on at least one of the roles and at least one of the coverages, wherein the at least one of the roles and the at least one of the coverages are selected from the read data, and wherein the entitlement data is indicative of the users, the at least one of the secured resources, and an action performed regarding the at least one of the secured resources.

23. The method of claim 22, wherein determining whether the users are entitled to access secured resources includes determining whether an entitlements administrator is entitled to administer secured resources.

24. The method of claim 22, wherein determining whether the users are entitled to access secured resources includes determining whether the users are entitled to access organizational information.

25. A computer-implemented entitlement system for controlling access to secured resources of an organization, the entitlement system comprising at least one processor and operatively associated data storage comprising instructions that, when executed by the at least one processor, cause the entitlement system to implement:
  a computer-implemented organizational information system that manages and stores organizational data at an organizational information database, wherein the organizational data is stored in the organizational information database according to a logical data model that comprises:
  user identities;
  teams, wherein each team is associated with at least one of the user identities;
  relationships, wherein each relationship defines a relationship between at least one of the user identities and at least one of the teams or between at least two of the teams;
  roles, wherein each role defines a job function assigned to at least one of the teams or to at least one of the user identities; and
  coverages, wherein each coverage defines a scope of responsibility of at least one of the teams or of at least one of the user identities that is associated with at least one of the teams, with respect to an associated one of the roles, and wherein each coverage comprises one or more coverage attributes selected from at least one of data describing a line of business, a product, a client and a system;
a plurality of entitlements engines each comprising an integrator, an entitlements database, and a store of business rules logic, wherein the entitlements engines are in electronic communication with the organizational information system and applications that use secured resources, wherein each of the entitlements engines is programmed to determine whether users of the applications are entitled to access secured resources via the applications based on the entitlement data stored in the entitlements database, wherein each of the entitlements engines is configured to service at least one of the applications; and wherein each entitlements engine further comprises:
  the integrator in electronic communication with the entitlements database and the store of business rules logic, wherein the integrator is programmed to:
  read data from the organizational information system; and
  apply the business rules logic to the read data to create entitlement data that is stored in the entitlements database, wherein the business rules logic specifies access policies that define, for at least one of the secured resources, an access policy based on at least one of the roles and at least one of the coverages, and wherein the entitlement data is indicative of the users, the at least one of the secured resources, and an action performed regarding the at least one of the secured resources.

* * * * *